United States Patent
Akiyama et al.

(10) Patent No.: US 7,268,840 B2
(45) Date of Patent: Sep. 11, 2007

(54) DISPLAY DEVICE EMPLOYING LIGHT CONTROL MEMBER AND DISPLAY DEVICE MANUFACTURING METHOD

(75) Inventors: Takashi Akiyama, Sayama (JP); Katsuo Matsuyama, Tokyo (JP)

(73) Assignee: Citizen Holdings Co., Ltd., Tokyo (JP)

( * ) Notice: Subject to any disclaimer, the term of this patent is extended or adjusted under 35 U.S.C. 154(b) by 43 days.

(21) Appl. No.: 10/869,068

(22) Filed: Jun. 17, 2004

(65) Prior Publication Data
US 2005/0041175 A1 Feb. 24, 2005

(30) Foreign Application Priority Data
Jun. 18, 2003 (JP) ............... 2003-173335
Jun. 18, 2003 (JP) ............... 2003-173336

(51) Int. Cl.
*G02F 1/1335* (2006.01)

(52) U.S. Cl. ......................... 349/61; 349/112

(58) Field of Classification Search ............ 349/61, 349/112
See application file for complete search history.

(56) References Cited

U.S. PATENT DOCUMENTS 5,629,784 A * 5/1997 Abileah et al. ............ 349/112

6,864,934 B2 * 3/2005 Yoshii et al. ................ 349/113
2002/0003593 A1 * 1/2002 Arakawa et al. .............. 349/65

FOREIGN PATENT DOCUMENTS

| JP | A-2000-301550 | 10/2000 |
| JP | A-2001-33766 | 2/2001 |
| JP | A-2001-75087 | 3/2001 |
| JP | A-2001-83304 | 3/2001 |
| JP | A-2001-105435 | 4/2001 |
| JP | A-2002-189108 | 7/2002 |

* cited by examiner

*Primary Examiner*—Toan Ton
(74) *Attorney, Agent, or Firm*—Finnegan, Henderson, Farabow, Garrett & Dunner, L.L.P.

(57) ABSTRACT

A liquid crystal is sealed with a sealing member between first and second transparent substrates, whereby a liquid crystal cell capable of transmitting ultraviolet light is produced. The liquid crystal cell is inserted into a mould into which an ultraviolet-setting resin is dropped and which is used to produce a light control member. The ultraviolet-setting resin is pressed to be bonded to the liquid crystal cell. In this state, ultraviolet light is irradiated to the liquid crystal cell in the mould from outside the mould. Thus, the ultraviolet-setting resin is set while bonding to the liquid crystal cell. Thereafter, the liquid crystal cell is removed from the mould. Consequently, the light control member is directly formed on the liquid crystal cell.

11 Claims, 18 Drawing Sheets

PRIOR ART

Prior Art

DISPLAY DEVICE EMPLOYING LIGHT CONTROL MEMBER AND DISPLAY DEVICE MANUFACTURING METHOD

CROSS-REFERENCE TO RELATED APPLICATION

This application has priority over, and incorporates by reference, the entire disclosure of Japanese Patent Applications Nos. 2003-173335 and 2003-17336 filed on Jun. 18, 2003.

BACKGROUND OF THE INVENTION

1. Field of the Invention

The present invention relates to a display device and a display device manufacturing method as well as a method of manufacturing the components of the display device. More particularly, the present invention is concerned with a display device including an electro-optic converting member, which can control an amount of transmitted light by utilizing an electric action, such as a liquid crystal cell, and also including a light control member for controlling refraction of light, a method of manufacturing the display device, and a method of manufacturing the components of the display device.

2. Description of the Related Art

To date, liquid crystal display devices have rapidly been evolved as one form of display device in various fields owing to the features of lower power consumption, thin design, low weight, and others. In particular, the liquid crystal display device is adopted for the majority of personal digital assistant equipment, including portable cellular phones, whose prevalence has grown in recent years.

Moreover, the liquid crystal display device adopted for the personal digital assistant equipment is designed with an emphasis on low power consumption for a longer service life of a battery. However, as the liquid crystal display device is not a type of display device that glows itself, it is hard to discern the display in an environment in which sufficient extraneous light is not available. Therefore, the personal digital assistant equipment has a backlight disposed as an auxiliary light source on one side of a liquid crystal cell opposite to the side at which a viewer exists. The liquid crystal display device having the backlight falls into a transmissive type and a transflective type. However, these types of liquid crystal display devices are very poor at efficient use of light.

A proposal has been made for a reflective liquid crystal display device including one polarizer and adopting a front light, which is disposed on the side of a liquid crystal cell on which a viewer exists, as an auxiliary light source. However, as a light guide plate for introducing light emitted from the front light is disposed on the side on which a viewer of the liquid crystal panel or cell lies, the liquid crystal display device is made thicker by the thickness of the light guide plate. Normally, as the light guide plate has a thickness of about 1 mm, the liquid crystal display device becomes thicker by 1 mm at a minimum. Moreover, when the front light is adopted, a light guide plate having unevenness is employed. Therefore, a protective plate called windshield must be placed on the external side of the light guide plate in order to protect the light guide plate from damage. This increases the thickness of the liquid crystal display device. In reality, when consideration is taken into the thickness of the windshield, an extra thickness of 3 mm is added to the thickness of the liquid crystal panel.

Japanese Unexamined Patent Application Publication No. 2001-33766 has proposed a liquid crystal display device having an auxiliary light source mounted on a lateral side thereof. The liquid crystal display device is of a reflective type having a reflecting layer formed on an outermost layer thereof. The reflective liquid crystal display device has a liquid crystal layer sealed with a sealing member between two transparent substrates. A first polarizing member supported using a double-faced adhesive is placed on the external side of one of the transparent substrates, and a light control member is disposed in a space between the first polarizing member and the first transparent substrate. A second polarizing member is layered on the external side of the other transparent substrate, and a reflective layer is formed on the external side of the second polarizing member.

When incident light approximates a line perpendicular to the surface of the light control member, the light control member transmits the light. When the incident light approximates a line horizontal to the surface thereof, the light control member reflects the light. The light control member is intended to increase an amount of light transmitted by the liquid crystal layer. A light source is in close contact with the lateral sides of the layered transparent substrates. The light control member reflects light, which emanates from the light source, in the direction in which liquid crystalline molecules are aligned.

SUMMARY OF THE INVENTION

The foregoing light control member has an optical film bonded to the top of the first transparent substrate. If the light control member is displaced relative to the first transparent substrate, the adhesive via which the first polarizing member is supported on the first transparent substrate oozes out onto one end of the uneven portion of the light control member. This causes the first polarizing member to tilt relative to the first transparent substrate. Consequently, the thickness of a liquid crystal display member increases. Furthermore, the same problem occurs even when the adhesive is applied at an incorrect position on the light control member. Moreover, even if the position of the light control member on the first transparent substrate is correct but the adhesive is applied at an incorrect position, the first polarizing member tilts relative to the first transparent substrate for the same reason. Consequently, the thickness of a liquid crystal display member increases.

Furthermore, if the adhesive or the like is positioned on the light control member but not to the first transparent substrate, an object to be bonded is changed from a predetermined one and a bond strength is changed from a pre-set one. Besides, if the first polarizing member tilts, blurring of display occurs at a position away from the first transparent substrate. This results in an unclear display image.

An object of the present invention is to provide a display device that includes a light control member which is thin enough to be portable and that can be manufactured at a low cost, a method of manufacturing the display device, and a method of manufacturing the components of the display device. Another object of the present invention is to provide a display device structured so that a first polarizing member placed on a first transparent substrate will not tilt relative to the first transparent substrate even when a light control member is placed on the first transparent substrate.

The present invention is intended to accomplish the above objects and has the first to twenty-second aspects described below.

According to the first aspect, there is provided a display device comprising: a first transparent substrate having an electrode; a second transparent substrate having an electrode; a display cell having an electro-optic converting member, of which optical characteristic is varied with an electric action, sealed between the first and second transparent substrates; and a light control member made of an ultraviolet-setting resin and formed directly on the external side of the first transparent substrate opposite to the side thereof in contact with the electro-optic converting member.

According to the second aspect, in the display device according to the first aspect, the electro-optic converting member is sealed between the sides of the first and second transparent substrates having the respective transparent electrodes formed thereon. The electro-optic converting member can transmit ultraviolet light. The light control member is formed directly on the external side of the first transparent substrate, so that the ultraviolet light can be irradiated to the side of the second transparent substrate opposite to the side thereof in contact with the electro-optic converting member.

According to the third aspect, the display device in accordance with the first aspect further comprises at least a light source mounted on the end surface of the first transparent substrate. The light control member has an irregular shape while having a plurality of parallel grooves formed along one of the edges of the first transparent substrate on the side thereof on which the light source is mounted.

According to the fourth aspect, the grooves formed in the display device in accordance with the third aspect are V-shaped grooves.

According to the fifth aspect, in the display device according to the first aspect, the maximum height of the portion of the light control member near the light source is smaller than the height of the portion thereof away from the light source.

According to the sixth aspect, in the display device according to the first aspect, a first polarizing member supported by a spacer is placed on the external side of the light control member opposite to the side thereof in contact with the first transparent substrate. The surface of the spacer on which the first polarizing member is supported is located higher than the light control member.

According to the seventh aspect, in the display device according to the sixth aspect, the spacer formed around a display area of the display device is made of the same material as the light control member.

According to the eighth aspect, in the display device according to the first aspect, the light control member formed on the external side of the first transparent substrate lies over the entire surface of the first transparent substrate.

According to the ninth aspect, in the display device according to the sixth aspect, the spacer is an adhering member mounted on the irregular portion of the light control member.

According to the tenth aspect, in the display device according to the sixth aspect, the spacer is formed at least along one edge of a frame area around a display area of the display device.

According to the eleventh aspect, in the display device according to the tenth aspect, the one edge is one of the edges of the area around the display area that is located farthest away from the light source.

According to the twelfth aspect, in the display device according to the first aspect, the first transparent substrate has a portion thereof jutting out relative to the second transparent substrate. The light control member formed on the external side of the first transparent substrate lies over the entire surface thereof except the jut portion.

According to the thirteenth aspect, there is provided a method of manufacturing the display device in accordance with the first aspect. The display device manufacturing method comprises the steps of: producing a display cell that can transmit ultraviolet light; pouring an ultraviolet-setting resin into a mould that is engraved along with the shape of the light control member; placing the display cell on the ultraviolet-setting resin in the mould so that the display cell will be superposed on the ultraviolet-setting resin; irradiating ultraviolet light to the side of the display cell opposite to the side thereof in contact with the ultraviolet-setting resin; allowing the ultraviolet-setting resin to set with the ultraviolet light transmitted by the display cell; and removing the display cell from the mould so as to thus form the light control member on the display cell.

According to the fourteenth aspect, in the display device according to the first aspect, the display cell has a liquid crystal sealed between the first and second transparent substrates. A sealing member is used to prevent the liquid crystal from leaking out of a gap between the first and second transparent substrates.

According to the fifteenth aspect, in the display device manufacturing method according to the thirteenth aspect, the display cell put in the mould is a single display cell.

According to the sixteenth aspect, in the display device manufacturing method according to the thirteenth aspect, the display cell put in the mould is a set of a plurality of display cells.

According to the seventeenth aspect, the display device manufacturing method according to the fifteenth aspect further comprises a step of cutting the set of display cells apart so as to produce a single display cell.

According to the eighteenth aspect, there is provided a method of manufacturing the display device in accordance with the first aspect. The display device manufacturing method comprises the steps of: producing at least an electrode on a first transparent substrate; pouring an ultraviolet-setting resin in a mould that is engraved along with the shape of a light control member; putting the first transparent substrate, which has the electrode formed thereon, on the ultraviolet-setting resin in the mould so that the first transparent substrate will be superposed on the ultraviolet-setting resin; irradiating ultraviolet light to the side of the first transparent substrate opposite to the side thereof in contact with the ultraviolet-setting resin; allowing the ultraviolet-setting resin to set with the ultraviolet light transmitted by the first transparent substrate; removing the first transparent substrate from the mould so as to thus form the light control member on the first transparent substrate; bonding the first transparent substrate to a second transparent substrate; and sandwiching an electro-optic converting member between the first and second transparent substrates.

According to the nineteenth aspect, in the display device manufacturing method according to the eighteenth aspect, the electrode formed on the first transparent substrate is coated with an alignment layer.

According to the twentieth aspect, in the display device manufacturing method according to the eighteenth aspect, the first transparent substrate having the electrode created thereon and being put in the mould is a sole first transparent substrate.

According to the twenty-first aspect, in the display device manufacturing method according to the eighteenth aspect, the first transparent substrate having the electrode formed thereon and being put in the mould is a set of a plurality of first transparent substrates.

According to the twenty-second aspect, the display device manufacturing method according to the twenty-first aspect further comprises a step of cutting the set of first transparent substrates apart so as to produce a single first transparent substrate.

BRIEF DESCRIPTION OF THE DRAWINGS

The present invention will be more clearly understood from the description set forth below with reference to the accompanying drawings, wherein.

DESCRIPTION OF THE PREFERRED EMBODIMENTS

Prior to a description of the preferred embodiments of the present invention, a liquid crystal display device employing a conventional light control member and a method of manufacturing the display device will be described in conjunction with FIG. 1A to FIG. 2.

Figure 1A:
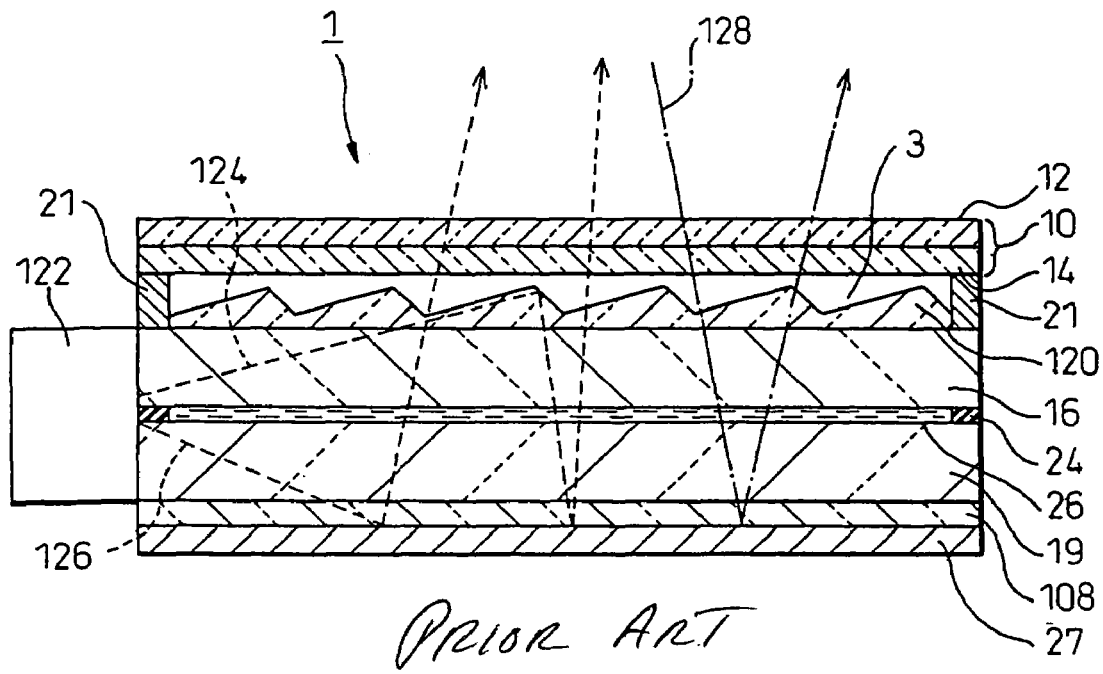
FIG. 1A is a sectional view of the structure of an example of a conventional liquid crystal display device having a light source mounted on a lateral side thereof.

FIG. 1A shows a liquid crystal display device 1 described in Japanese Unexamined Patent Application Publication No. 2001-33766. The liquid crystal display device 1 is of a reflective type having a reflective layer 27 formed as an outermost layer of the liquid crystal display device 1. The liquid crystal display device 1 has a liquid crystal layer 26 sealed with a sealing member 24 between a first transparent substrate 16 and a second transparent substrate 19. The thickness of the liquid crystal layer 26 is about 5 µm. A first polarizing member 10 composed of a first polarizer 12 and a phase difference plate 14 is placed on the external side of the first transparent substrate 16 while being supported by a spacer 21. A supporting member having an adhesive applied to both ends of a base member may be substituted for the spacer 21. A light control member 120 is formed in a space 3 between the first polarizing member 10 supported by the spacer 21 and the first transparent substrate 16. A second polarizer 108 is layered on the external side of the second transparent substrate 19, and the reflective layer 27 is formed on the external side of the second polarizer 108.

The light control member 120 is formed by bonding a film, of which the thickness is about 100 µm, to the top of the first transparent substrate 16 directly or with an adhesive between them. The light control member 120 has unevenness extended in a direction perpendicular to an edge of the display device on which a light source 122 is mounted. The uneven portion extends parallel to the edge of the display device on which the light source 122 is mounted, and is realized with a plurality of equidistant grooves so that any part of the uneven portion will have the same cross-sectional shape (triangularly projecting shape). Moreover, the cross section of the uneven portion is characterized by a segment that has an angle of elevation of 4.6° relative to a horizontal plane parallel to the top of the light source 122 and has a length of 45 µm, and a segment that has an angle of depression of 20° relative to a horizontal plane containing the terminal point of the segment and has a length of 55 µm. The height of a ridge defined by the two segments is 20 µm. The light control member 120 has the ridge repeatedly formed with a pitch of 0.3 mm between adjoining ridges.

When incident light approximates a line perpendicular to the surface of the light control member 120 having the foregoing structure, the light control member 120 transmits the light. When the incident light approximates a line horizontal thereto, the light control member reflects the light.

The light source 122 is brought into close contact with the lateral sides of the first and second transparent substrates 16 and 19 respectively. Among light rays emitted from the light source 122, a light ray 126 heading for the reflective layer 27 is reflected from the reflective layer 27, and radiated to the outside by way of the light control member 120. Moreover, a light ray 124 emitted from the light source 122 and heading for the light control member 120 is reflected from the light control member 120 to the liquid crystal layer 26, and reflected again from the reflective layer 27. Thereafter, the light ray is radiated to outside by way of the light control member 120. Moreover, light 128 coming from outside passes through the light control member 120, and is reflected from the reflective layer 27 and radiated to outside.

Figure 1B:
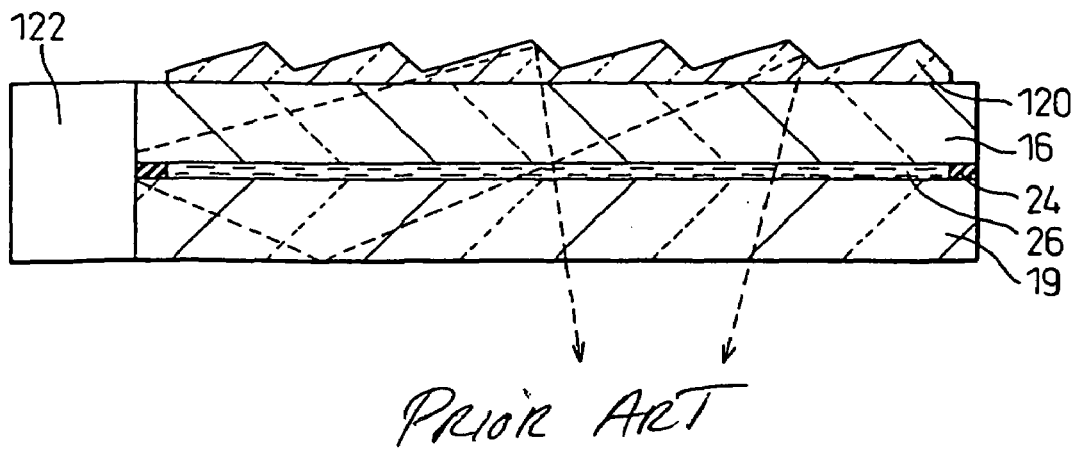
FIG. 1B is a sectional view showing the structure of another example of a conventional liquid crystal display device having a light source mounted on a lateral side thereof.

FIG. 1B shows the structure of a conventional scattering liquid crystal display device 2. The same reference numerals are assigned to components identical to those of the reflective liquid crystal display device 1 shown in FIG. 1A. The liquid crystal display device 2 shown in FIG. 1B has, similarly to the liquid crystal display device 1 shown in FIG. 1A, a liquid crystal layer 26 sealed with a sealing member 24 between a first transparent substrate 16 and a second transparent substrate 19. The only difference from the reflective liquid crystal display device 1 is that a liquid crystal adopted as the liquid crystal layer 26 is of a scattering type that permits control of scattering and transmission of light with application of a voltage.

Unlike the liquid crystal display device 1, a first polarizing member 10 composed of a first polarizer 12 and a phase difference plate 14 is not placed on the external side of the first transparent substrate 16. However, a light control member 120 similar to the one included in the liquid crystal display device 1 is formed on the first transparent substrate 16.

A light source 122 is mounted on the lateral sides of the first and second transparent substrates 16 and 19 respectively. Among light rays emitted from the light source 122, a light ray heading for the light control member 120 is reflected from the light control member, and radiated to outside (downward in FIG. 1B) by way of the first transparent substrate 16, liquid crystal layer 26, and second transparent substrate 19. Moreover, among the light rays emitted from the light source 122, a light ray getting out of the second transparent substrate 19 is reflected from the second transparent substrate, headed for the light control member 120, reflected from the light control member, and radiated to outside (downward in FIG. 1B) by way of the first transparent substrate 16, liquid crystal layer 26, and second transparent substrate 19.

Figure 2:
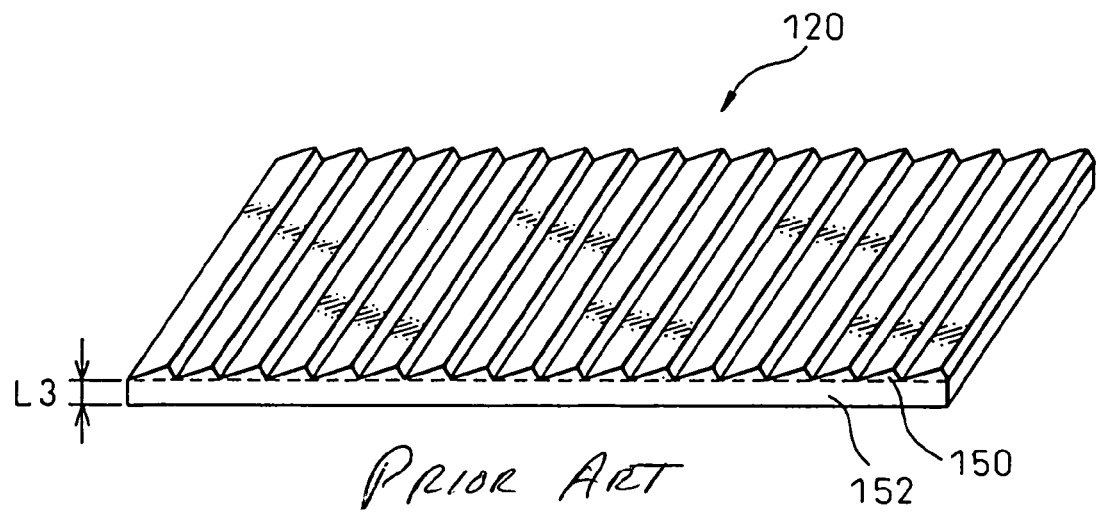
FIG. 2 is a perspective view showing the structure of an optical film employed in FIG. 1A and FIG. 1B.

FIG. 2 shows an example of a light control member 120 disclosed in Japanese Unexamined Patent Application Publication No. 2001-83304. The light control member 120 is realized with an optical film having an uneven portion 150 formed on an even portion 152. In terms of film strength, the even portion 152 must have a thickness of at least several tens of micrometers.

When the optical film described in Japanese Unexamined Patent Application Publication No. 2001-833304 is employed in the liquid crystal display device 1 shown in FIG. 1A, the thickness of the liquid crystal display device 1 increases. Moreover, as the optical film is bonded in an early stage of a process of manufacturing a liquid crystal display device, the optical film must have durability to chemicals used at succeeding steps and durability to heat applied at succeeding steps. An optically preferable material has not been found.

Figure 3:
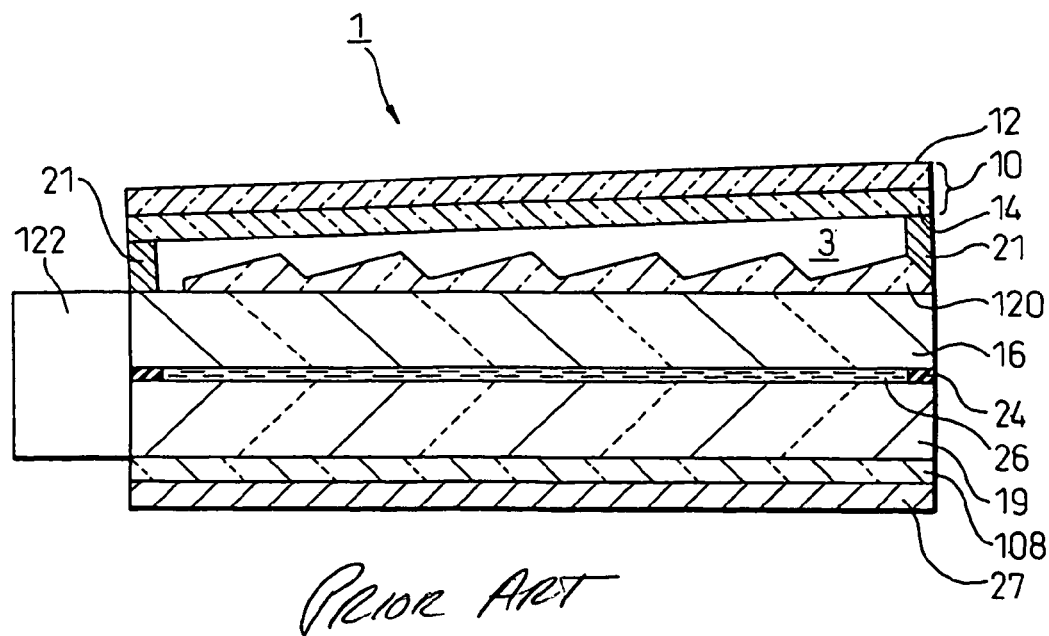
FIG. 3 is an explanatory diagram concerning a problem which arises when the optical film is not attached to a correct position in the liquid crystal display device shown in FIG. 1A.

FIG. 1A and FIG. 1B show cases where the optical film 120 is placed in position on the first transparent substrate 16. As shown in FIG. 3, showing the same structure as the one of FIG. 1A, the optical film 120 need not be placed in position on the first transparent substrate 16 but may be, for example, displaced rightward in the drawing. In this case, the spacer 21 is mounted on the light control member 120. Consequently, the first polarizing member 10 is not parallel to the first transparent substrate 16. Eventually, the thickness of the liquid crystal display device 1 increases, and an object to be bonded with the spacer 21 changes to vary a bond strength.

Moreover, even when the optical film 120 is placed in position on the first transparent substrate 16, if part or the whole of the spacer 21 is mounted on the optical film 120 and bonded thereto, the first polarizing member 10 tilts relative to the first transparent substrate 16. Furthermore, when the first polarizing member 10 tilts, a blur of display occurs at a position away from the first transparent substrate 16. This poses a problem in that a display image becomes unclear.

The present invention attempts to solve the problems underlying the conventional liquid crystal display devices. A description will be made of a liquid crystal display device in accordance with the present invention including a thin light control member and realizing a lower cost of manufacture, and a method of manufacturing the display device. In descriptions of embodiments of the present invention, for a better understanding, the same reference numerals will be assigned to components identical to those of the conventional liquid crystal display devices 1 and 2 described in conjunction with FIG. 1A to FIG. 3.

Figure 4A:
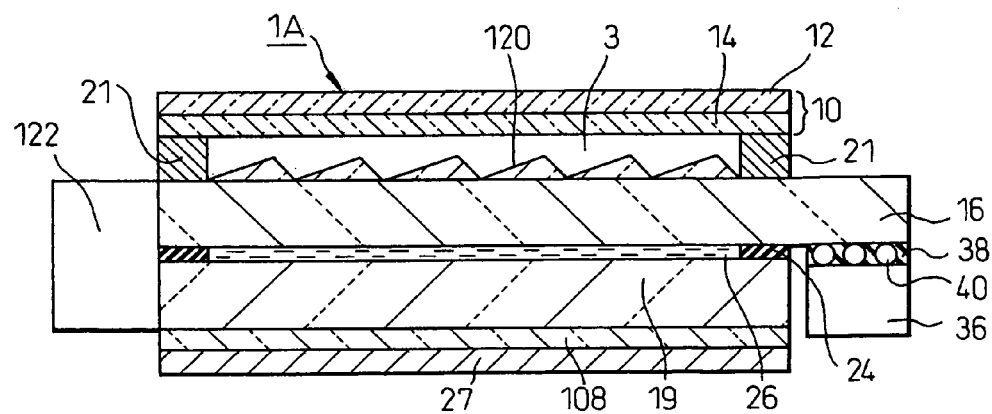
FIG. 4A is a sectional view showing the structure of a liquid crystal display device including a first example of a liquid crystal cell employed in the present invention.

FIG. 4A shows the structure of a liquid crystal display device 1A including a first example of a liquid crystal cell employed in the present invention. The liquid crystal display device 1A has a liquid crystal layer 26 sealed with a sealing member 24 between a first transparent substrate 16 and a second transparent substrate 19. The thickness of the liquid crystal layer 26 is about 5 μm. A first polarizing member 10 composed of a first polarizer 12 and a phase difference plate 14 is placed on the external side of the first transparent substrate 16 while being supported by a spacer 21. A light control member 120 is formed in a space 3 between the first polarizing member 10 supported by the spacer 21 and the first transparent substrate 16. A second polarizer 108 is layered on the external side of the second transparent substrate 19. A reflective layer 27 is formed on the external side of the second polarizer 108. A transparent electrode and an alignment layer are formed on the sides of the first and second transparent substrates 16 and 19 clamping the liquid crystal layer 26, though they are not shown. A light source 122 is mounted on one lateral sides of the first and second transparent substrates 16 and 19, and realized with LEDs or a fluorescent tube.

The light control member 120 employed in this example is made of an ultraviolet-setting resin and is formed directly on the first transparent substrate 16. The side of the light control member 120 opposite to the side thereof in contact with the first transparent substrate 16 has unevenness, and the uneven portion is realized by forming a plurality of V-shaped grooves equidistantly. The grooves are juxtaposed in parallel to an edge of the liquid crystal cell on which the light source 122 is mounted. Moreover, the uneven portion is characterized by a segment whose angle of elevation relative to a horizontal plane parallel to the top of the light source 122 is 4.6° and whose length is 245 μm and a segment whose angle of depression relative to a horizontal plane containing a limit of the segment is 20° and whose length is 55 μm. The height of a ridge defined with the two segments is 20 μm. The light control member 120 has the ridge repeatedly formed with a pitch of 0.3 mm between adjoining ridges. Noted is that these numerical values are presented as examples. The angles and shape defining the ridge vary depending on the size of a liquid crystal panel or the number of pixels.

When incident light approximates a line perpendicular to the surface of the light control member 120 having the foregoing structure, the light control member 120 transmits the light. When the incident light approximates a line horizontal thereto, the light control member 120 reflects the light. Transmission or reflection of light by the light control member 120 has been described in conjunction with FIG. 1A. The reiteration will be omitted. Moreover, a procedure of forming the light control member on the first transparent substance 16 will be described later. The spacer 21 in this example is formed with an adhering member exhibiting adhesion to each of the first polarizing member 10 and first transparent substrate 16. The adhering member may be formed with an adhesive alone or by applying an adhesive to both ends of a base member of the adhering member.

The upper side in the drawing of the liquid crystal display device 1A having the first example is a viewer side. The first transparent substrate 16 is extended in the direction of an edge of the liquid crystal cell opposite to the edge thereof on which the light source 122 is mounted, and gets longer than the second transparent substrate 19. An integrated circuit 36 for driving the liquid crystal display device 1A is attached to the bottom of the extended portion with an anisotropic conductive film 38 containing conductive particles 40 between them.

Figure 4B:
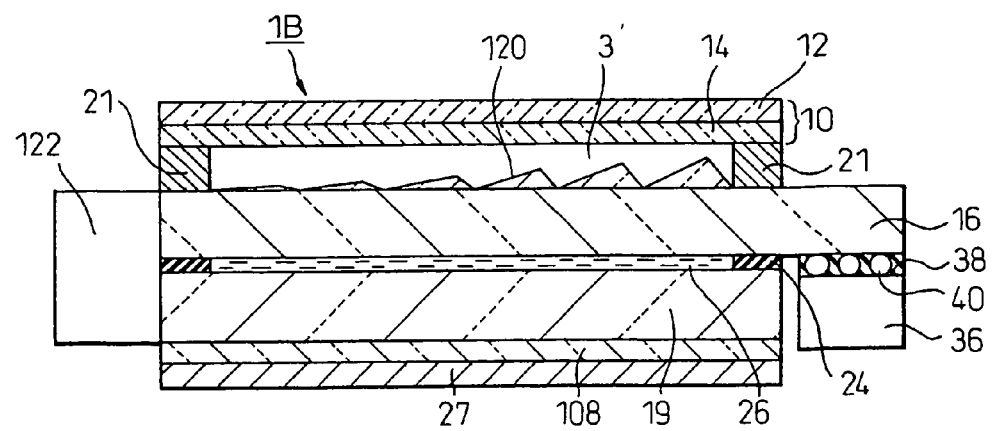
FIG. 4B is a sectional view showing the structure of a liquid crystal display device including a second example of a liquid crystal cell employed in the present invention.

FIG. 4B shows the structure of a liquid crystal display device 1B including a second example of a liquid crystal cell employed in the present invention. The liquid crystal display device 1B is different from the liquid crystal display device 1A in the shape of the light control member 120. In the liquid crystal display device 1A, the continuous triangular cross-sectional shape of the light control member 120 is the same between one portion of the light control member 120 located near the light source 122 and the other portion thereof located near the integrated circuit 36. On the other hand, in the liquid crystal display device 1B, the continuous triangular cross-sectional shape of the portion of the light control member 120 located near the light source 122 is smaller and the continuous triangular cross-sectional shape of the portion thereof located near the integrated circuit 36 is larger. In other words, the height of the continuous triangular cross-sectional shape of the portion of the light control member 120 located near the integrated circuit 36 is larger than the height of the continuous triangular cross-sectional shape of the portion thereof located near the light source 122. Incidentally, neither transparent electrodes nor alignment layers are shown in FIG. 4B.

The height of the triangular cross-sectional shape is determined so that it will become gradually larger as it recedes from the light source 122 to approach the integrated circuit 36. This is because light emitted from the light source 122 gets weaker as it recedes from the light source 122 and is the weakest at the integrated circuit 36. As the portion of the light control member 120 having a larger triangular cross-sectional area exhibits a higher index of refraction than the portion thereof having a smaller cross-sectional area, the portion of the light control member 120 having the larger triangular cross-sectional area reflects a larger amount of light. Although light emitted from the light source 122 gets weakened at the integrated circuit 36, as the light control circuit 120 reflects a larger amount of light, the luminance on the display surface of a liquid crystal cell 54 given by light emitted from the light source 122 mounted on one edge of the first transparent substrate 16 is equalized.

The light control member 120 having the shape shown in FIG. 4B can be readily manufactured by engraving the shape of the light control member 120 in a mould in advance. In the light control member 120 shown in FIG. 4A, the triangular cross-sectional shape is high all over the surface of the light control member 120. Depending on a required optical characteristic, part of the triangular cross-sectional shape may be high or the triangular cross-sectional shape may get gradually higher. The height of the triangular cross-sectional shape may not only be varied linearly but may be varied as if to plot a graph of a square function with a certain curvature. Moreover, for a larger amount of reflected light, the height of the triangular cross-sectional shape may be increased or the density of triangular cross-sectional shapes may be raised.

Figure 5A:
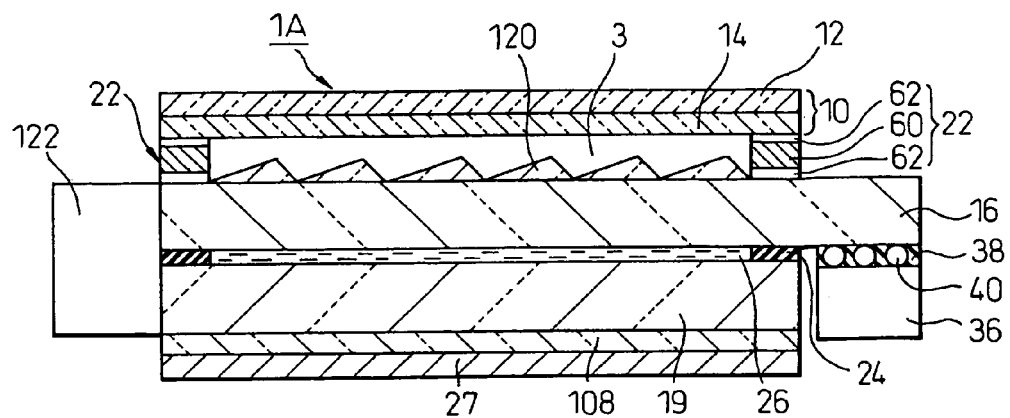
FIG. 5A is a sectional view showing the structure of a variant of the liquid crystal display device including the first example of a liquid crystal cell employed in the present invention.

FIG. 5A shows the structure of a variant of the liquid crystal display device 1A including the first example of a liquid crystal cell employed in the present invention. The liquid crystal display device 1A shown in FIG. 5A is different from the liquid crystal display device 1A shown in FIG. 4A in the spacer 21 supporting the first polarizing member 10. The spacer 21 is made of a base member 60 having a predetermined height, and the top and bottom of the base member 60 are bonded to the first transparent substrate 16 and first polarizing member 10 respectively using an adhesive 62. Incidentally, neither transparent electrodes nor alignment layers are shown in FIG. 5A.

Figure 5B:
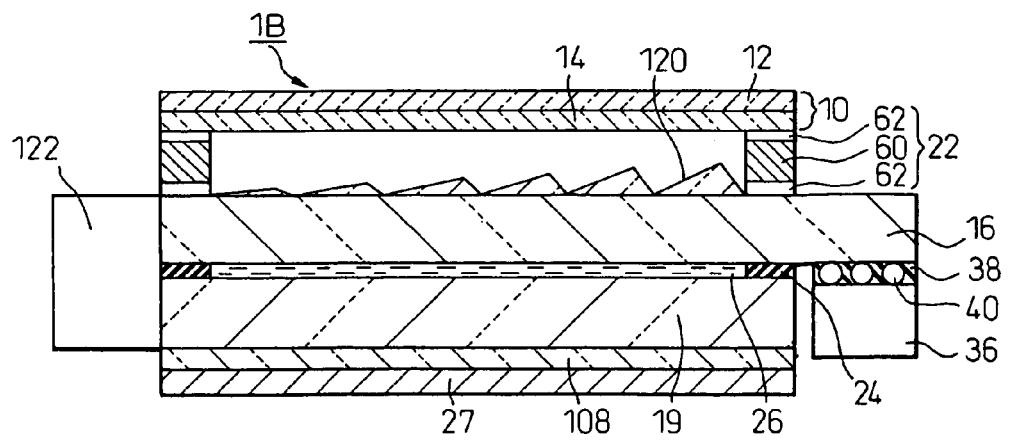
FIG. 5B is a sectional view showing the structure of a variant of the liquid crystal display device including the second example of a liquid crystal cell employed in the present invention.

FIG. 5B shows the structure of a variant of the liquid crystal display device 2B including the second example of a liquid crystal cell employed in the present invention. The liquid crystal display device 1B shown in FIG. 5B is different from the liquid crystal display device 1B shown in FIG. 4B in a point that the spacer 21 supporting the first polarizing member 10 is replaced with an adhering member 22 having the same structure as the one shown in FIG. 5A. Incidentally, neither transparent electrodes nor alignment layers are shown in FIG. 5B.

AS mentioned above, when the adhering member 22 including the base member 60 is used to support the first polarizing member 10, since the height of the base member 60 is constant, a predetermined space 3 can be preserved between the first polarizing member 10 and the first transparent substrate 16.

Figure 6A:
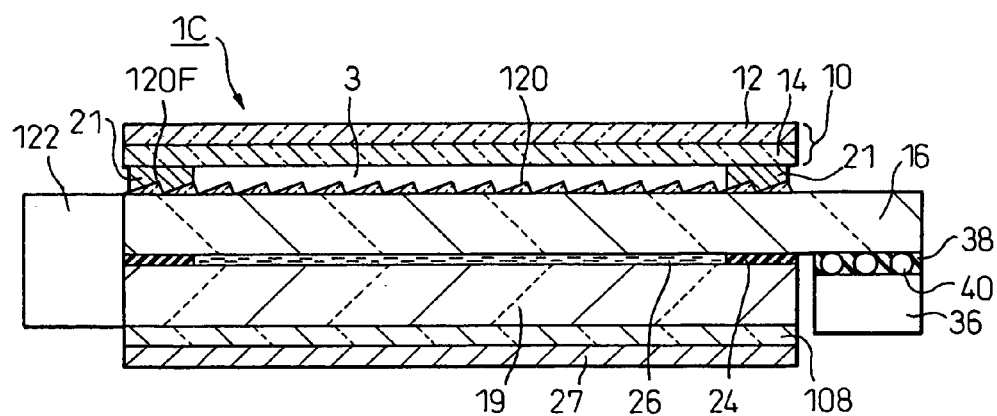
FIG. 6A is a sectional view showing the structure of a liquid crystal display device including a third example of a liquid crystal cell employed in the present invention.

FIG. 6A shows the structure of a liquid crystal display device 1C including a third example of a liquid crystal cell employed in the present invention. The liquid crystal display device 1C shown in FIG. 6A is different from the liquid crystal display device 1A shown in FIG. 4A in the deposition of the light control member 120 on the first transparent substrate 16. In the liquid crystal display device 1A shown in FIG. 4A, the light control member 120 is formed inside the double-faced adhesive 120. In contrast, in the liquid crystal display device 1C including the third example as shown in FIG. 6A, the light control member 120 is extended to a portion of the first transparent substrate 16 indicated with 120F. Incidentally, neither transparent electrodes nor alignment layers are shown in FIG. 6A.

The spacer 21 is therefore mounted on the extended portion 120F of the light control member 120, and adheres to each of the light control member 120 and first polarizing member 10. When the light control member 120 has the extended portion 120F, the spacer 21 is bonded to the light control member 120. In the case of the liquid crystal display device 1A shown in FIG. 4A, the spacer 21 must be accurately bonded to the light control member 120 for fear the spacer may be superposed on the light control member 120. In this example of a liquid crystal cell, since the spacer 21 is bonded to the light control member 120, the light control member 120 need not be accurately formed on the first transparent substrate 16. The spacer 21 included in this example is realized with an adhering member having enough adhesion to each of the first polarizing member 10 and light control member 120. The adhering member may be realized with an adhesive alone or with a base member having an adhesive applied to both ends thereof.

Figure 6B:
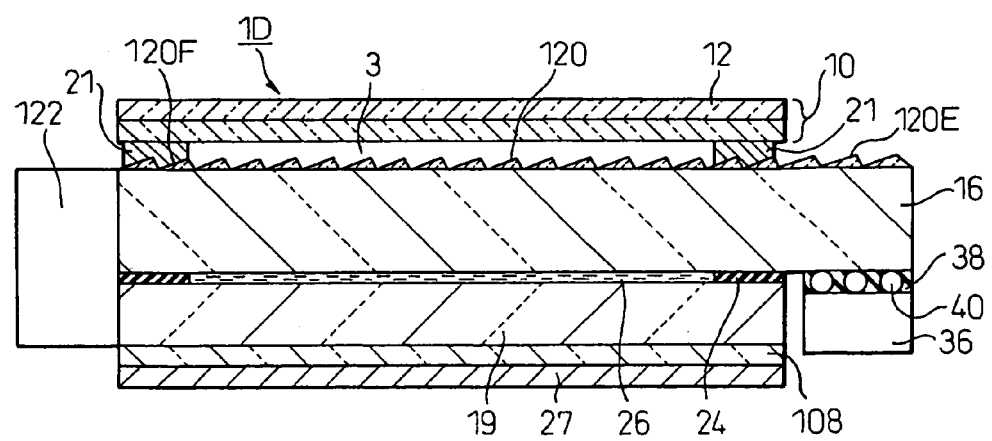
FIG. 6B is a sectional view showing the structure of a liquid crystal display device including a fourth example of a liquid crystal cell employed in the present invention.

FIG. 6B shows the structure of a liquid crystal display device 1D including a liquid crystal cell employed in the present invention. The liquid crystal display device 1D shown in FIG. 6B is different from the liquid crystal display device 1C shown in FIG. 6A in a position at which the light control member 120 is formed. In the liquid crystal display device 1D shown in FIG. 6B, the light control member 120 is extended to the portion of the first transparent substrate 16 having the integrated circuit 36 attached thereto. Even in the present example of a liquid crystal cell, the spacer 21 need not be accurately bonded to the first transparent substrate 16. Incidentally, neither transparent electrodes nor alignment layers are shown in FIG. 6B.

FIG. 7A to FIG. 7E show steps constituting an example of a method of manufacturing a liquid crystal cell employed in the present invention.

Figure 7A:
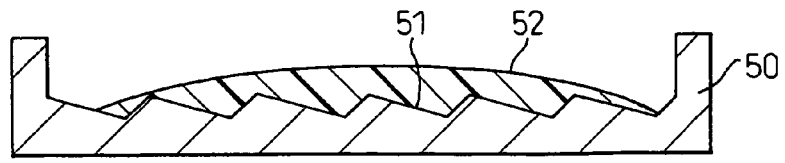
FIG. 7A to FIG. 7E show steps constituting an example of a method of manufacturing the liquid crystal cell employed in the present invention.

FIG. 7A shows a state in which an appropriate quantity of an optical-setting resin 52 is dropped into a mould 50. The mould 50 has V-shaped grooves 51, which correspond to the uneven portion of the light control member 120, formed in the bottom thereof. The V-shaped grooves 51 are formed equidistantly in the bottom of the mould 50. The continuous triangular cross-sectional shape of the V-shaped grooves 51 may be a right angled triangle, an isosceles triangle, or a scalene triangle. Moreover, as the optical-setting resin 52, for example, an acrylic ultraviolet-setting adhering resin may be adopted.

Figure 7B:
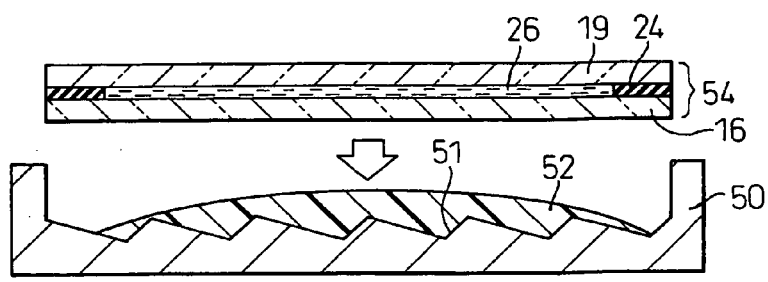

Concurrently with, or prior to, the step of dropping an appropriate quantity of the optical-setting resin 52 into the mould 50, the liquid crystal cell 54 is prepared by superposing the first and second transparent substrates 16 and 19 on each other and then sealing the liquid crystal layer 26 with the frame-like sealing member 24 between the first and second transparent substrates. Neither transparent electrodes nor alignment layers are shown in FIG. 7A. The liquid crystal cell 54 is, as shown in FIG. 7B, inserted into the mould 50 with the first transparent substrate 16 opposed to the mould 50, and then pressed. At this time, the resin 52 in the mould 50 spreads all over the mould 50 while being pressed by the first transparent substrate 16, and enters all the grooves 51. The quantity of the resin 52 is preferably equal to the total volume of the grooves 51 in the mould 50. However, as the grooves 51 must be filled with the resin 52, the quantity of the resin 52 is larger than the volume of the grooves 51. The mould 50 has an escape groove (not shown), into which the resin 52 is led, formed so that an excessive quantity of the resin 52 leaking out of the grooves 51 can be removed.

Figure 7C:
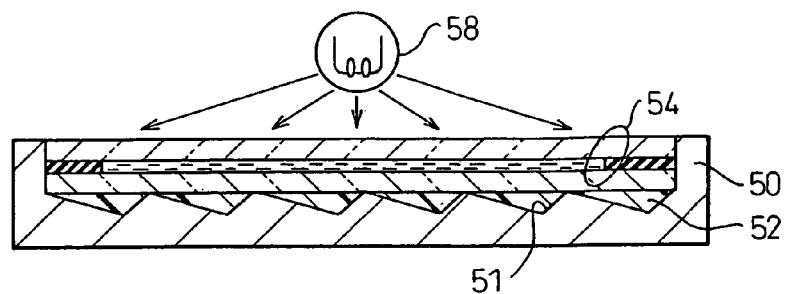

FIG. 7C shows a state in which the grooves in the mould 50 are fully filled with the resin 52 while being in contact with the first transparent substrate 16. In this example of a liquid crystal cell, in this state, a light source 58 that emits ultraviolet light and is located outside the liquid crystal cell 54 is used to irradiate ultraviolet light to the second transparent substrate 19 included in the liquid crystal cell 54. At this time, the liquid crystal cell 54 including the liquid crystal layer is transparent to ultraviolet light. Therefore, the ultraviolet light is transmitted by the liquid crystal cell 54 and irradiated onto the resin 52. Consequently, the resin 52 is set by the ultraviolet light while adhering to the first transparent substrate 16.

Figure 7D:
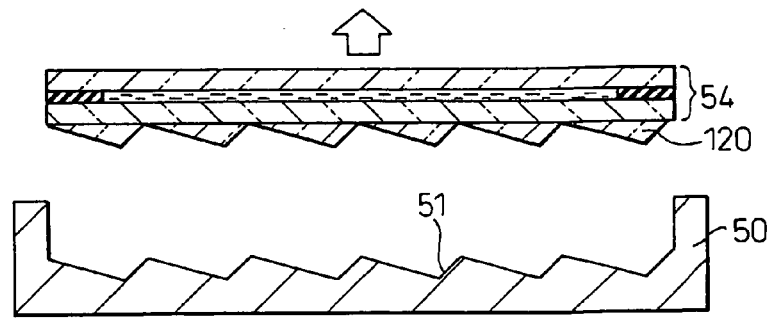
Figure 7E:
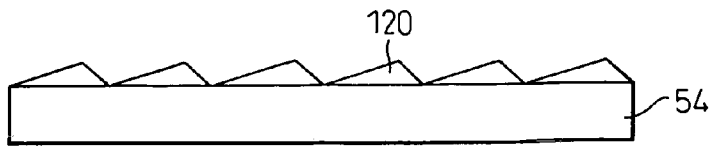

After the resin 52 sets while adhering to the first transparent substrate 16, when the liquid crystal cell 54 is, as shown in FIG. 7D, peeled off from the mould 50, the resin 52 is transferred as the light control member 120 to the liquid crystal cell 54. FIG. 7E shows the liquid crystal cell 54 having the light control member 120 thus formed thereon. The liquid crystal cell 54 formed according to the foregoing manufacturing method can be adapted to the liquid crystal display device 1D described in conjunction with FIG. 6B.

As mentioned above, the light control member 120 formed on the first transparent substrate 16 does not require an even portion corresponding to the even portion 152 of the optical film shown in FIG. 2. Therefore, the light control member 120 can be formed thinly. This helps realize a thin liquid crystal display device.

The liquid crystal cell 54 employed in the foregoing manufacturing method may be a finished goods having a liquid crystal substance sealed therein or a semifinished goods having the sealing member 24 formed therein but not having the liquid crystal substance sealed therein. Moreover, the resin 52 may be a thermosetting resin. In this case, the light control member 120 is preferably formed on a semifinished liquid crystal cell, in which a liquid crystal substance is not sealed, in order to prevent deterioration of the quality of the liquid crystal substance.

When the light control member 120 is formed using a mould in the same manner as it is in this example, if the number of manufactured products in one mould is large, the cost of manufacture becomes very low. Furthermore, as long as the mould is produced highly precisely, it is easy to align the mould 50 with the liquid crystal cell 54. Moreover, as the light control member 120 is formed on the liquid crystal cell 54 having the first and second transparent substrates 16 and 19 bonded to each other using the sealing member 24, the number of manufacturing steps succeeding formation of the light control member is small, and the risk that the uneven portion of the light control member 120 is flawed is reduced. After the light control member 120 is formed on a first transparent substrate using the mould 50, the liquid crystal cell 54 may be completed using the first transparent substrate.

Moreover, at the step when the light control member 120 is formed on the liquid crystal cell 54 that is made by using the sealing member 24, almost all steps of manufacturing the liquid crystal cell 54 have finished. So that the number of remaining steps for manufacturing a liquid crystal cell is small, the number of chemicals to be used at the succeeding steps is small, and the number of succeeding steps at which high temperature processing is performed is small. Consequently, a resin that is to be made into the light control member 120 and has durability to the chemicals and durability to high temperature can be selected easily, and a resin exhibiting a good optical characteristic can be selected.

Figure 8A:
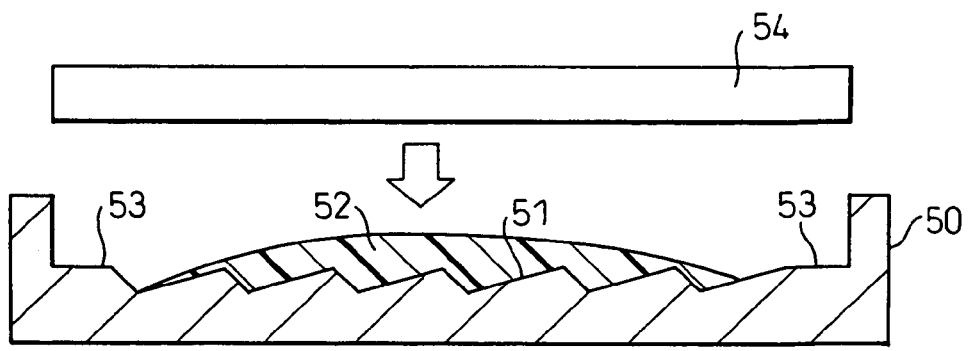
FIG. 8A is a sectional view showing one of steps constituting another example of a method of manufacturing the liquid crystal cell employed in the present invention.

FIG. 8A is a sectional view showing one of steps constituting another example of a method of manufacturing a display device in accordance with the present invention. The step corresponds to the step included in the aforesaid manufacturing method and shown in FIG. 7B. In this example, the bottom of the mould 50 has even sections 53 in addition to the grooves 51. The even sections 53 are, as shown in FIG. 8C, formed in parallel with the grooves 51 along two edges of the bottom of the mould 50. The even sections 53 may be formed along any edges of the bottom of the mould 50, and the number of even sections 53 is not limited to any value.

Figure 8B:
FIG. 8B is a side view of a liquid crystal cell having a light control member and being produced at the manufacturing step shown in FIG. 8A.
Figure 8C:
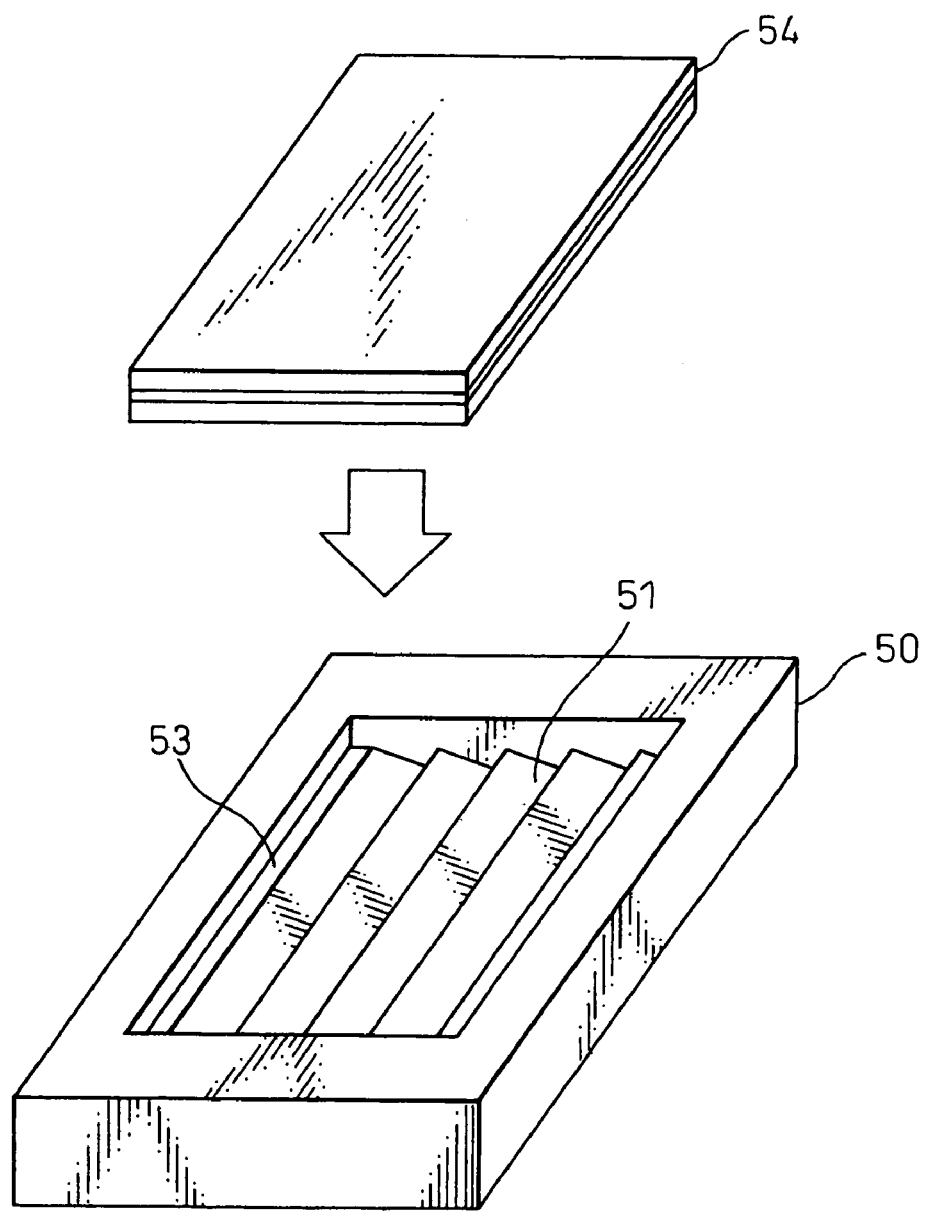
FIG. 8C is a perspective view showing the appearances of the liquid crystal cell produced at the step shown in FIG. 8A and of a mould employed at the step.

FIG. 8B shows the light control member 120 formed on the liquid crystal cell 54 at the manufacturing step shown in FIG. 8A owing to the even sections 53 formed in the bottom of the mould 50, the liquid crystal cell 54 has portions that are devoid of the light control member 120. The liquid crystal cell 54 manufactured according to this manufacturing method can be adapted to the liquid crystal display device 1A that has spaces by the sides of the light control member 120 as shown in FIG. 4A and FIG. 5A.

Figure 9A:
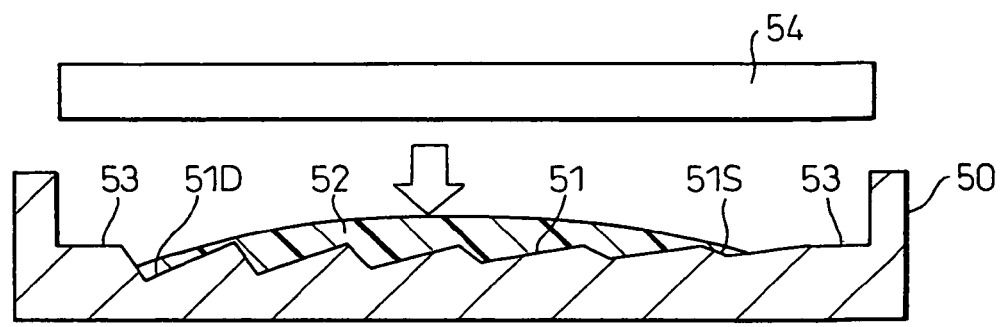
FIG. 9A is a sectional view showing one of steps constituting another example of a method of manufacturing the liquid crystal cell employed in the present invention.

FIG. 9A is a sectional view showing one of steps constituting another example of a method of manufacturing a display device in accordance with the present invention. The step corresponds to the step included in the aforesaid manufacturing method and shown in FIG. 7B. In this example, even sections 53 are formed along two edges of the bottom of the mould 50. Moreover, a groove adjoining one of the even sections 53 is a shallow groove 51S, and a groove adjoining the other even section 53 is a deep groove 51D. Namely, the grooves 51 get gradually deeper from the groove 51S to the groove 51D.

Figure 9B:
FIG. 9B is a side view of a liquid crystal cell having a light control member and being produced at the manufacturing step shown in FIG. 9A.

FIG. 9B shows the light control member 120 formed on the liquid crystal cell 54 at the manufacturing step shown in FIG. 9A. Owing to the even sections 53 formed in the mould 50, the liquid crystal cell 54 has portions having no light control member 120. Moreover, the height of the light control member 120 varies from a height L1 to a height L2 (>L1). The liquid crystal cell 54 produced according to this manufacturing method is adapted to the liquid crystal display device 1B shown in FIG. 4B and FIG. 5B.

Figure 10:
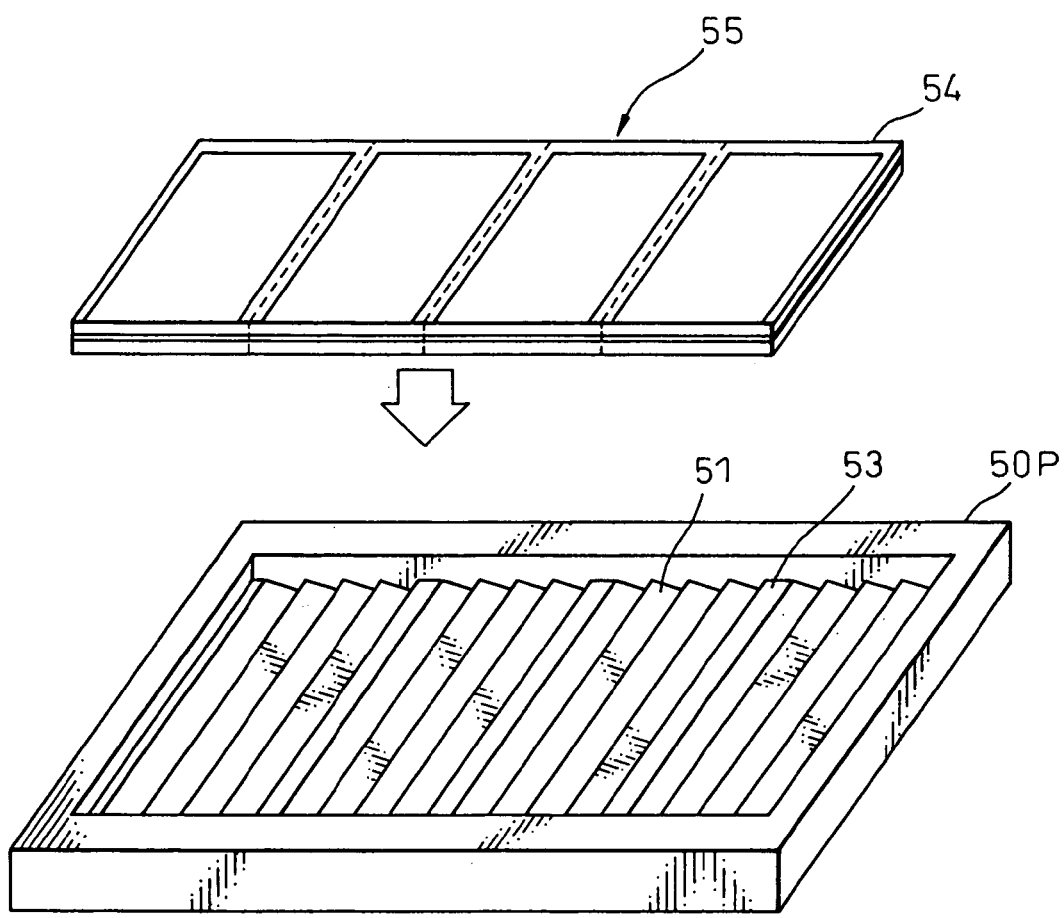
FIG. 10 is a perspective view showing the appearances of liquid crystal cells produced according to another method of manufacturing the liquid cell employed in the present invention and the appearance of a mould employed in the method.

FIG. 10 is a perspective view showing the appearances of liquid crystal cells produced according to another method of manufacturing a display device in accordance with the present invention and the appearance of a mould employed therein. In this example, a light control member is formed on a set 55 of liquid crystal cells including a plurality of liquid crystal cells 54 each having a liquid crystal sandwiched between a first transparent substrate and a second transparent substrate. In this example, the set 55 of liquid crystal cells having the rectangle liquid crystal cells 54 arranged tandem (a set of four liquid crystal cells 54) is put in a large mould 50P that has the grooves 51 and even sections 53 and that is designed to produce a plurality of light control members. The light control member 120 can therefore be simultaneously formed on the four liquid crystal cells 54 arranged tandem. After the light control member 120 is formed, the respective liquid crystal cells 54 are cut apart. When this method is adopted, the liquid crystal cell 54 may be either a finished panel having a liquid crystal substance sealed therein or a semifinished liquid crystal cell not having a liquid crystal sealed therein.

Figure 11A:
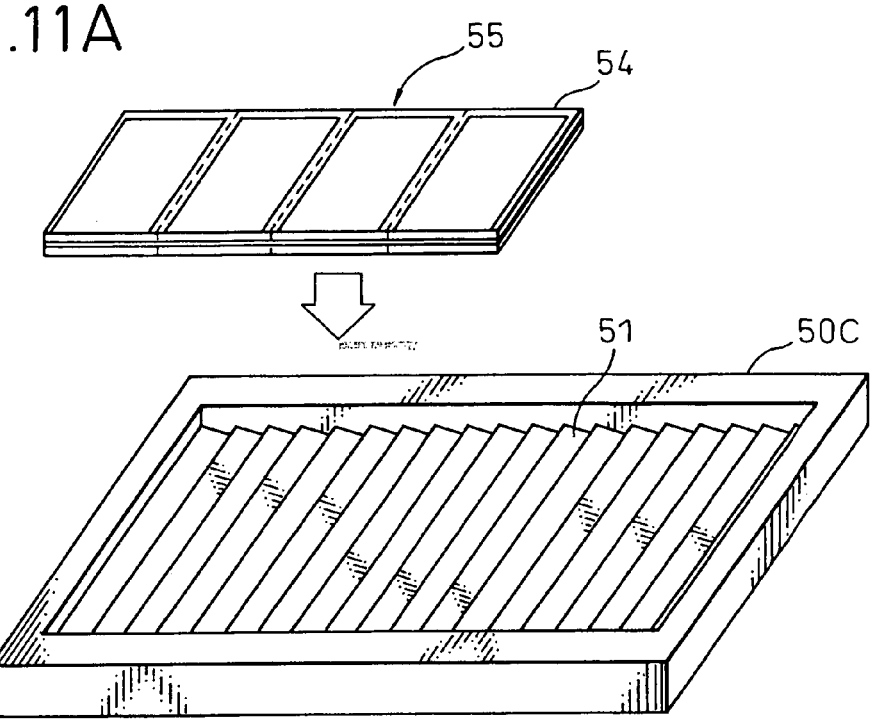
FIG. 11A is a perspective view showing the appearances of liquid crystal cells produced according to another method of manufacturing the liquid cell employed in the present invention and the appearance of a mould employed in the method.
Figure 11B:
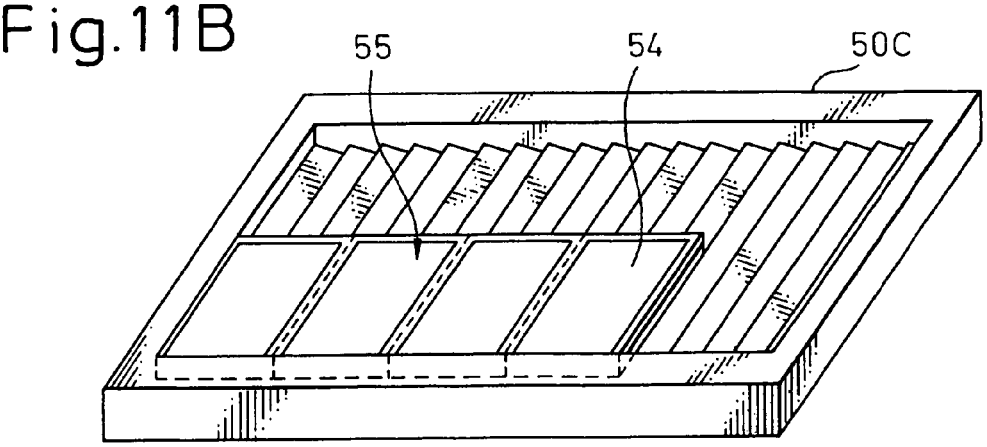
FIG. 11B is a perspective view showing a state in which the liquid crystal cells shown in FIG. 11A are placed on the mould shown therein.

FIG. 11A is a perspective view showing the appearances of liquid crystal cells produced according to still another method of manufacturing a display device in accordance with the present invention and the appearance of a mould employed therein. FIG. 11B is a perspective view showing a state in which liquid crystal cells are put in the mould shown in FIG. 11A. In this example, a common mould 50C whose opening is larger than the set 55 of liquid crystal cells 54 is prepared. The set 55 of liquid crystal cells 54 is, as shown in FIG. 11B, put in part of the large common mould 50C, and supported using a jig that is not shown. The common mould 50C can be used in common for liquid crystal cells having different sizes. This obviates the necessity of preparing a plurality of moulds according to the sizes of liquid crystal cells 54, and is highly economic.

Figure 12A:
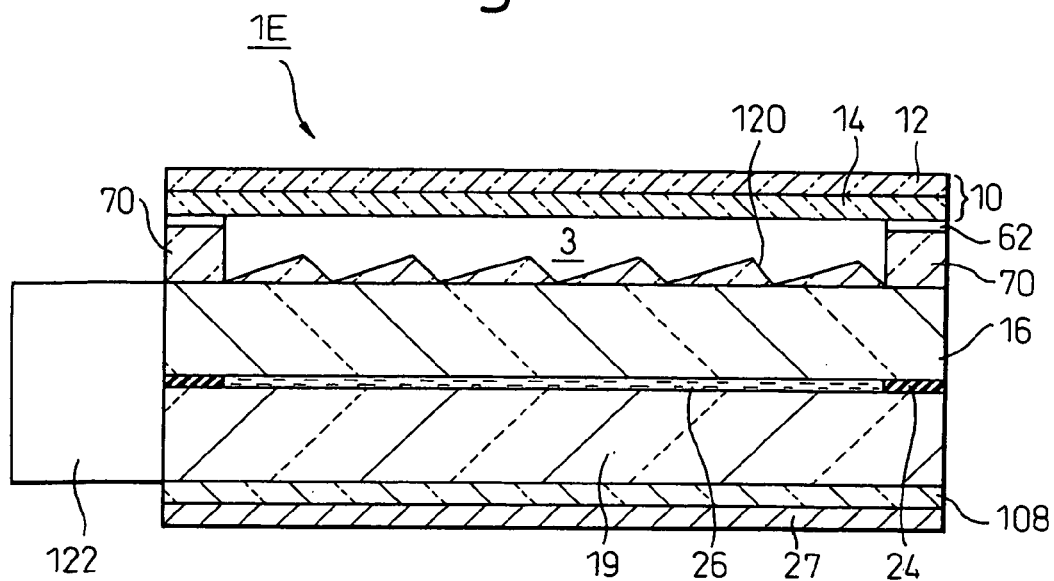
FIG. 12A is a sectional view showing the structure of a liquid crystal display device including a fifth example of a liquid crystal cell employed in the present invention.

FIG. 12A is a sectional view showing the structure of a liquid crystal display device 1E including a fifth example of a liquid crystal cell employed in the present invention. In this example, a spacer 70 higher than the uneven portion of the light control member and made of the same material as the light control member 120 is formed along the edges of the light control member 120 formed on the first transparent substance 16. The spacer 70 is bonded to the first polarizing member 10 with an adhesive 62 applied to the top thereof. The other components of the liquid crystal display device 1E are identical to those of the liquid crystal display device 1A shown in FIG. 4A. Neither transparent electrodes nor alignment layers are shown in FIG. 12A.

Figure 12B:
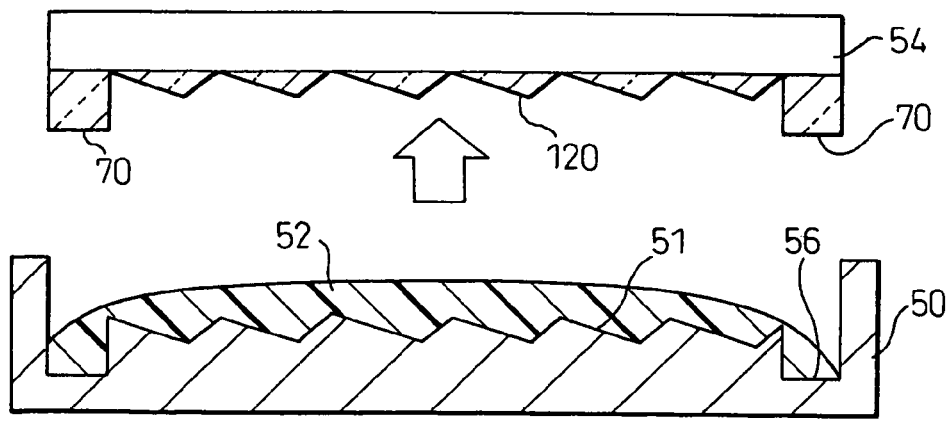
FIG. 12B is a sectional view showing one of steps constituting a method of manufacturing a liquid crystal cell included in the liquid crystal display device shown in FIG. 12A.

A spacer groove 56 is, as shown in FIG. 12B, formed along the edges of the mould 50, whereby the spacer 70 is formed concurrently with the light control member 120 during formation of the light control member 120. Consequently, unlike the aforesaid example, the spacer 21 for keeping the light control member 120 and first polarizing member 10 apart from each other and the adhering member 20 including the base member 60 are unnecessary. Accordingly, only by applying the adhesive 62 to the spacer 70, the spacer 70 can be bonded to the first polarizing member 10.

In the structure shown in FIG. 12A and FIG. 12B, the spacer 70 can be formed concurrently with the light control member 120 during formation of the light control member 120. Furthermore, as the height of the spacer 70 is uniform all the time, it is easy to bond the spacer 70 to the first polarizing member 10. Moreover, once the shape of the spacer is engraved in the mould 50 in advance, the spacer 70 can be formed without an increase in cost.

Figure 13A:
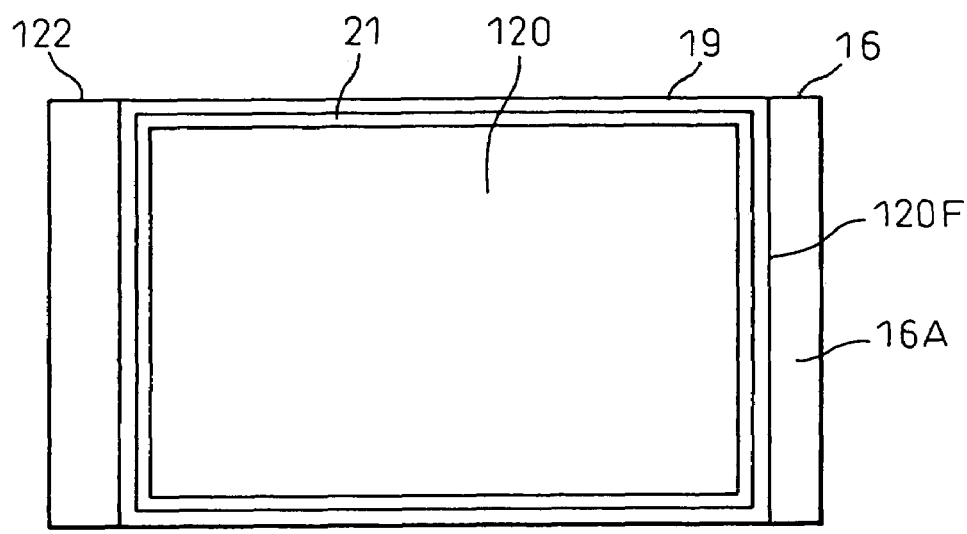
FIG. 13A is a plan view of a liquid crystal display device not having a light control member formed on an extended portion of a first transparent substrate.
Figure 13B:
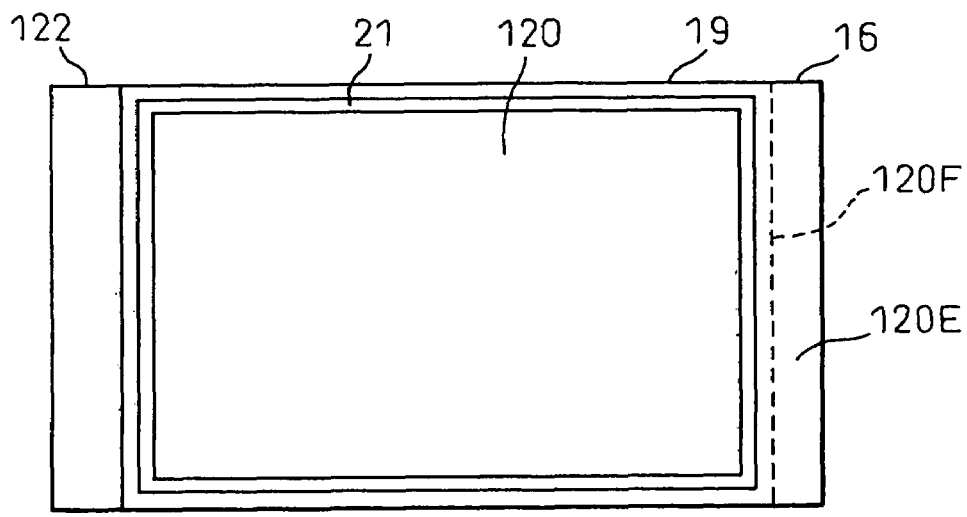
FIG. 13B is a plan view of a liquid crystal display device having a light control member formed on an extended portion of a first transparent substrate.

FIG. 13A is a plan view of the liquid crystal display device 1C shown in FIG. 6A, and FIG. 13B is a plan view of the liquid crystal display device 1D shown in FIG. 6B. In the liquid crystal display device 1C shown in FIG. 13A, the extended portion of the first transparent substrate 16 is devoid of the light control member 120. In contrast, in the liquid crystal display device 1D shown in FIG. 13B, the extended portion 16A of the first transparent substrate 16 has the light control member 120.

Figure 14A:
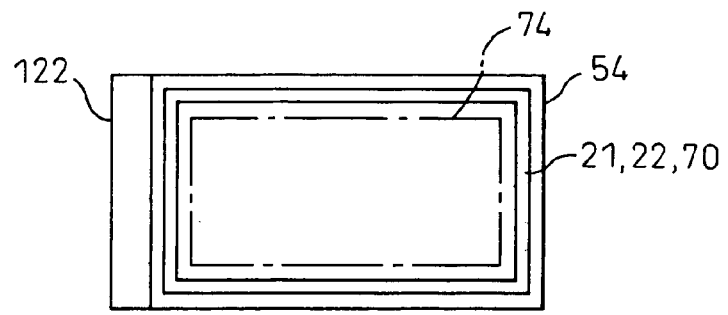
FIG. 14A is a plan view of a liquid crystal display device showing an example in which a double-faced adhesive, an adhering member, or a spacer that supports a first polarizing member included in the present invention is formed on a liquid crystal cell as if to be a frame having four edges.
Figure 14B:
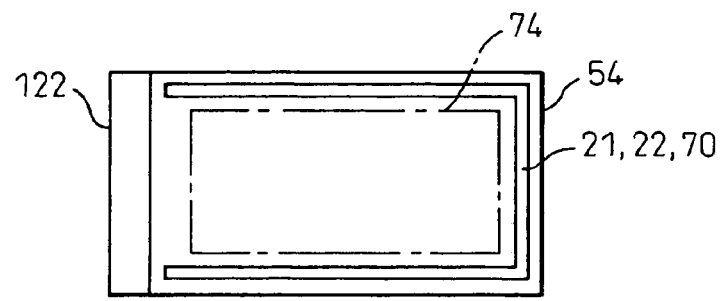
FIG. 14B is a plan view of a liquid crystal display device showing an example in which a double-faced adhesive, an adhering member, or a spacer that supports the first polarizing member included in the present invention is formed on a liquid crystal cell as if to be a frame having three edges.
Figure 14C:
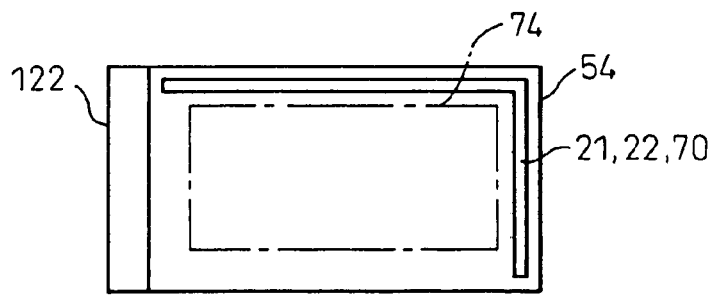
FIG. 14C is a plan view of a liquid crystal display device showing an example in which a double-faced adhesive, an adhering member, or a spacer that supports the first polarizing member included in the present invention is formed on a liquid crystal cell as if to be a frame having two edges.

FIG. 14A shows an example in which the spacer 21, adhering member 22, or spacer 70 that supports the first polarizing member 10 employed in the present invention is formed like a frame having four edges on the liquid crystal cell 54. A field indicated with a dot-dash line is a display area 74 on a liquid crystal display device. FIG. 14B shows an example in which the spacer 21, adhering member 22, or spacer 70 that supports the first polarizing member 10 employed in the present invention is formed like a frame having three edges on the liquid crystal cell 54. Moreover, FIG. 14C shows an example in which the spacer 21, adhering member 22, or spacer 70 that supports the first polarizing member 10 employed in the present invention is formed like a frame having two adjoining edges.

If the height of the unevenness of the light control member 120 is nearly uniform over the entire surface thereof, along whichever of the edges of the liquid crystal cell the spacer 70 is formed, no problem occurs. However, if the height of the unevenness of the light control member 120 is not uniform, for example, if the height of the unevenness increases as it recedes farther from the light source 122, the spacer 21, adhering member 22, or spacer 70 must be formed at least along the edge of the liquid crystal cell opposite to the edge thereof in contact with the light source 122. This is intended to prevent the unevenness of the light control member 120 from coming into contact with the first polarizing member 10, that is, to prevent the spacing between the unevenness of the light control member 120 and the first polarizing member 10 from being nullified.

Figure 15A:
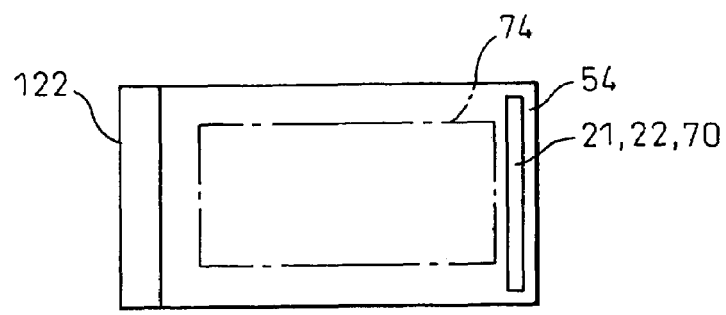
FIG. 15A is a plan view of a liquid crystal display device showing an example in which a double-faced adhesive, an adhering member, or a spacer that supports the first polarizing member included in the present invention is formed on a liquid crystal cell along an edge of the liquid crystal cell opposite to an edge thereof on which a light source is mounted.
Figure 15B:
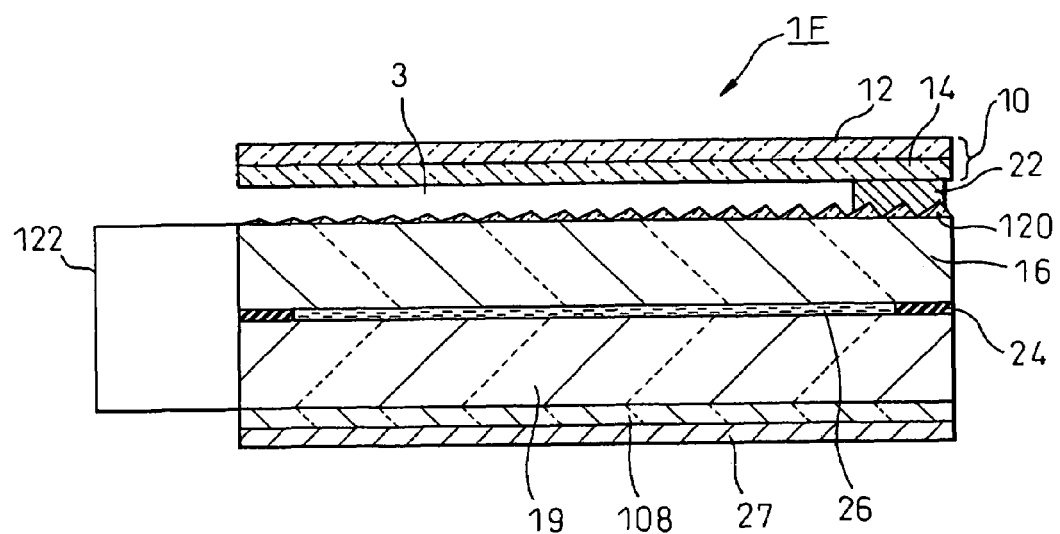
FIG. 15B is a sectional view of the liquid crystal display device shown in FIG. 15A.

FIG. 15A shows an example in which the spacer 21, adhering member 22, or spacer 70 that supports the first polarizing member employed in the present invention is formed on the edge of the liquid crystal cell 54 opposite to the edge thereof in contact with the light source 122. FIG. 15B is a sectional view of the liquid crystal cell shown in FIG. 15A, thus showing the structure of a liquid crystal display device 1F. The spacer 21, adhering member 22, or spacer 70 is formed outside a display field 74. The liquid crystal display device 1F has a liquid crystal layer 26 sealed with a sealing member 24 between a first transparent substrate 16 and a second transparent substrate 19. A first polarizing member 10 composed of a first sheet polarizer 12 and a phase difference plate 14 is supported by the adhering member 22 and placed on the external side of the first transparent substrate 16. A second sheet polarizer 108 is layered on the external side of the second transparent substrate 19, and a reflective layer 27 is formed on the external side of the second polarizer 108. A transparent electrode and an alignment layer are formed on each of the sides of the first and second transparent substrates 16 and 19 that are opposed to each other with the liquid crystal layer between them, though they are not shown in FIG. 15B. A light source 122 is mounted on one lateral sides of the first and second transparent substrates 16 and 19 respectively, and realized with LEDs or a fluorescent tube.

FIG. 16A to FIG. 16E show steps constituting an example of a method of manufacturing the first transparent substrate 16 by forming a light control member 120 on the first transparent substrate 16 that is provided with an electrode 6 and that is included in a display device in accordance with the present invention.

Figure 16A:
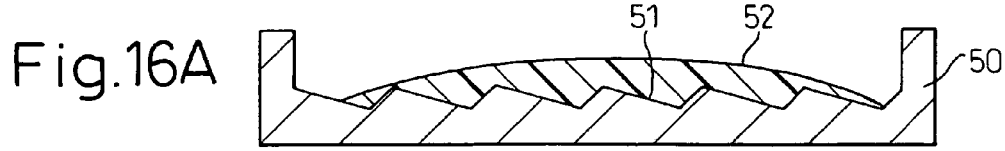
FIG. 16A to FIG. 16E show steps constituting an example of a method of manufacturing a transparent substrate, which is one of the components of a display device in accordance with the present invention, having an electrode formed thereon.

FIG. 16A shows a state in which an appropriate quantity of an optical-setting resin 52 is dropped into a mould 50. The mould 50 has V-shaped grooves 51, which realize the unevenness of the light control member 120, formed in the bottom thereof. The V-shaped grooves 51 are equidistantly and continuously formed in the bottom of the mould 50. The continuous triangular cross-sectional shape of the V-shaped grooves 51 may be any of a right angled triangle, an isosceles triangle, and a scalene triangle. Moreover, the optical-setting resin 52 may be, for example, an acrylic ultraviolet-setting adhesive resin.

Figure 16B:
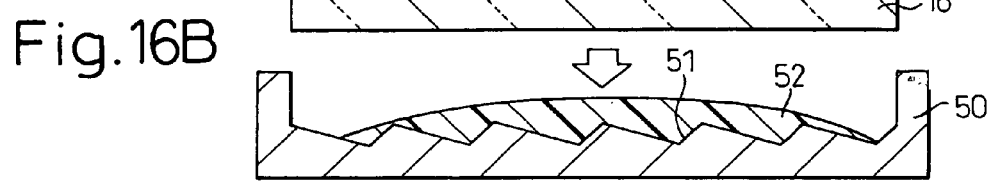

Concurrently with, or prior to, the step of dropping an appropriate quantity of the optical-setting resin 52 into the mould 50, the electrode 6 or an alignment layer formed on the electrode 6 is layered on the first transparent substrate 16. Herein, a case of the electrode 6 alone is layered on the first transparent substrate 16 is explained. The first transparent substrate 16 having the electrode 6 layered thereon is, as shown in FIG. 16B, inserted into the mould 50 so that the first transparent substrate 16 will be opposed to the mould 50, and then pressed. At this time, the resin 52 in the mould 50 is pressed by the first transparent substrate 16, and spread all over the mould 50 to enter all the grooves 51. The quantity of the resin 52 is preferably equal to the total volume of the grooves 51 in the mould 50. However, as the grooves 51 must be completely filled with the resin 52, the quantity of the resin 52 is normally larger than the total volume of the grooves 51. An escape groove (not shown) into which the resin 52 can escape is formed in the mould 50, whereby an extra resin 52 leaking out of the grooves 51 is removed.

Figure 16C:
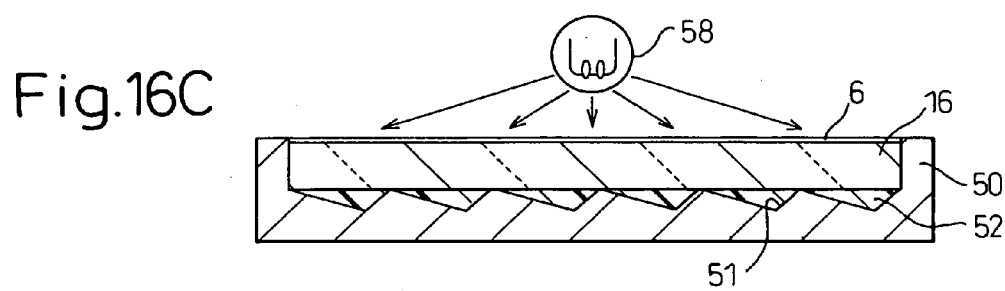

FIG. 16C shows a state in which the grooves 51 in the mould 50 are completely filled with the resin 52 while being in contact with the first transparent substrate 16. In this example, in this state, a light source 58 that lies outside the mould 50 and generates ultraviolet light irradiates ultraviolet light to the first transparent substrate 16 through the electrode 6. At this time, the first transparent substrate 16 as well as the electrode 6 is transparent to ultraviolet light. Consequently, the ultraviolet light is transmitted by the electrode 6 and first transparent substrate 16 and irradiated to the resin 52. Consequently, the resin 52 sets with the ultraviolet light while adhering to the first transparent substrate 16.

Figure 16D:
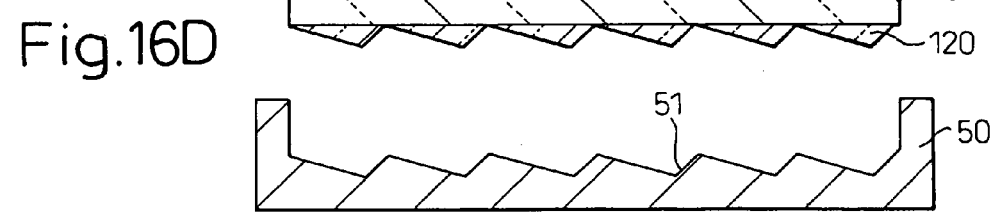
Figure 16E:
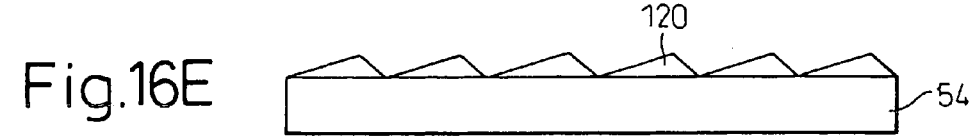

As mentioned above, after the resin 52 sets while adhering to the first transparent substrate 16, the first transparent substrate 16 is, as shown in FIG. 16D, peeled off from the mould 50. Consequently, the resin 52 is transferred as the light control member 120 to the first transparent substrate 16. FIG. 16E shows the first transparent substrate 16 having the light control member 120 thus formed thereon.

The first transparent substrate 16 formed according to the manufacturing method shown in FIG. 16A to FIG. 16E may be adapted to a reflective liquid crystal cell having a reflective layer formed as an outermost layer of the liquid crystal cell or may be adapted to a liquid crystal cell having a reflective layer interposed between the first transparent substrate 16 and second transparent substrate 19.

Figure 17A:
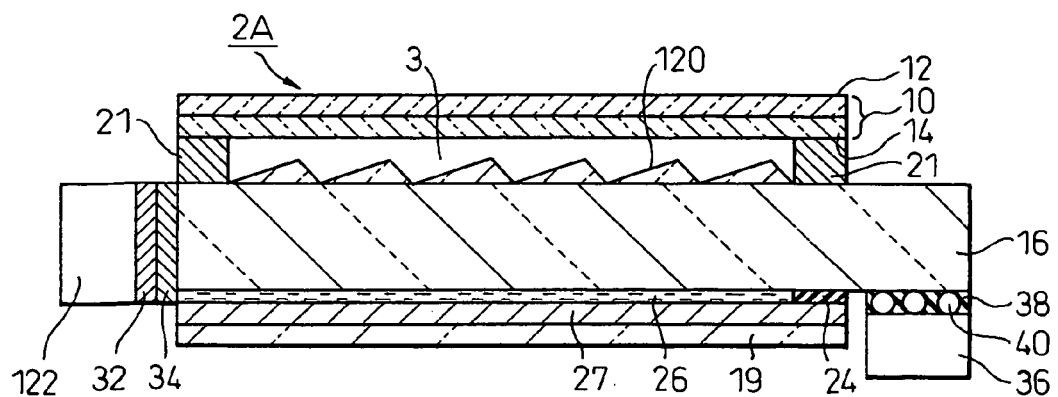
FIG. 17A is a sectional view showing a first embodiment of a liquid crystal display device which is manufactured using the component that has a light control member and is produced according to the manufacturing method shown in FIG. 16A to FIG. 16E, and which includes a reflective layer in a liquid crystal cell thereof.

FIG. 17A shows the structure of a liquid crystal display device 2A in accordance with a first embodiment that is manufactured using a first transparent substrate 16 having a light control member 120 formed thereon according to the manufacturing method shown in FIG. 16A to FIG. 16E, and that includes a reflective layer 27 in a liquid crystal cell thereof. A second transparent substrate 19 is superposed on the side of the first transparent substrate 16 where an electrode (not shown) is provided, with a liquid crystal layer 26 and the reflective layer 27 between them, whereby a liquid crystal cell is produced. The liquid crystal layer 26 is sealed with a sealing member 24 and has a thickness of about 5 μm. In the present embodiment, the second transparent substrate 19 is thinner than the first transparent substrate 16. The thickness of the second transparent substrate 19 may be level with that of the first transparent substrate 16 as it is in the aforesaid examples of liquid crystal cells. Otherwise, the second transparent substrate 19 may be thicker than the first transparent substrate 16.

Similarly to the liquid crystal display device 1A shown in FIG. 4A, a first polarizing member 10 composed of a first polarizer 12 and a phase difference plate 14 is placed on the external side of the first transparent substrate 16 of the liquid crystal display device 2A while being supported by a spacer 21. A light control member 120 formed according to the aforesaid manufacturing method is located in a space 3 between the first polarizing member 10 and the first transparent substrate 16.

A light source 122 is mounted on a lateral side of the first transparent substrate 16 with a second polarizer 32 and a second phase difference plate 34 between them. The upper side in this drawing of the liquid crystal display device 2A in accordance with the first embodiment is a viewer side. The first transparent substrate 16 is extended to the lateral side of the liquid crystal display device opposite to the lateral side thereof on which the light source 122 is mounted, and is longer than the second transparent substrate 19. An integrated circuit 36 for driving the liquid crystal display device 2A is coupled to the bottom of the extended portion via an anisotropic conductive film 38 that contains conductive particles 40.

Figure 17B:
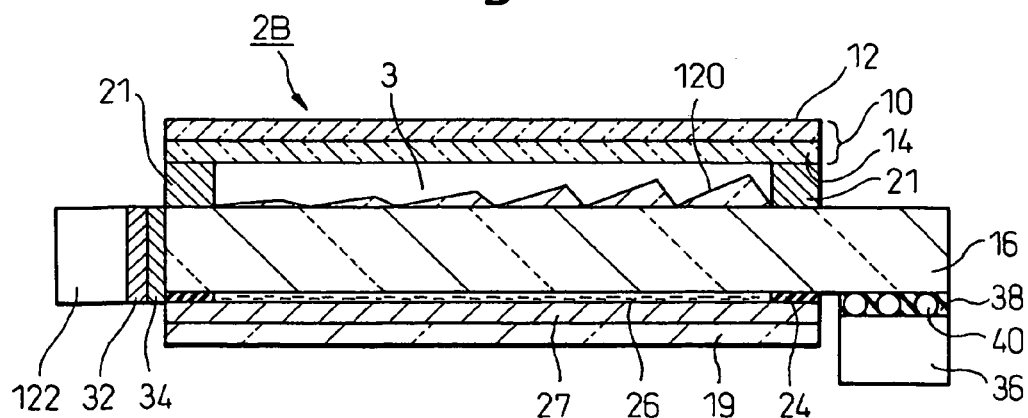
FIG. 17B is a sectional view showing a second embodiment of a liquid crystal display device which is manufactured using the component that has a light control member and is produced according to the manufacturing method shown in FIG. 16A to FIG. 16E, and which includes a reflective layer in a liquid crystal cell thereof.

FIG. 17B shows a liquid crystal display device 2B in accordance with a second embodiment that is manufactured using a first transparent substrate 16 or a component having a light control member 120 formed thereon according to the manufacturing method shown in FIG. 16A to FIG. 16E, and that includes a reflective layer 27 in a liquid crystal cell thereof. A second transparent substrate 19 is superposed on the side of the first transparent substrate 16 where an electrode (not shown) is provided, with a liquid crystal layer 26 and the reflective layer 27 between them, whereby the liquid crystal cell is produced. The liquid crystal layer 26 is sealed with a sealing member 24 and has a thickness of about 5 μm.

A difference of the liquid crystal display device 2B from the liquid crystal display device 2A lies in the shape of the light control member 120. In the liquid crystal display device 2A, the continuous triangular cross-sectional shape of the light control member 120 is the same between one portion of the light control member 120 located near the light source 122 and the other portion thereof located near the integrated circuit 36. On the other hand, in the liquid crystal display device 2B, the continuous triangular cross-sectional shape of one portion of the light control member 120 located near a light source 122 is smaller, and the continuous triangular cross-sectional shape of the other portion thereof located near an integrated circuit 36 is larger. In other words, the height of the continuous triangular cross-sectional shape of the portion of the light control member 120 located near the integrated circuit 36 is larger than the height of the continuous triangular cross-sectional shape of the other portion thereof located near the light source 122. The function of the light control member 120 having the cross-sectional shape is to equalize the luminance, on the display surface of the liquid crystal cell, generated by light radiated from the light source 122.

The light control member 120 shaped as shown in FIG. 17B can be easily produced merely by engraving the shape in the bottom of the mould 50 shown in FIG. 16B in advance. The continuous triangular cross-sectional shape of the light control member 120 shown in FIG. 17B is high all over the surface of the light control member 120. Depending on a required optical characteristic, the triangular cross-sectional shape may be partly high or may be made gradually higher. The height of the triangular cross-sectional shape may be not only varied linearly but also varied as if to plot a graph of a square function at a certain curvature.

Figure 17C:
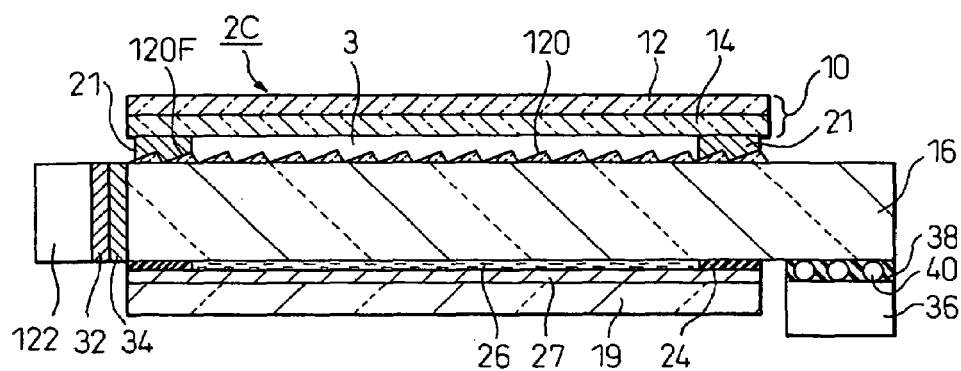
FIG. 17C is a sectional view showing a third embodiment of a liquid crystal display device which is manufactured using the component that has a light control member and is produced according to the manufacturing method shown in FIG. 16A to FIG. 16E, and which includes a reflective layer in a liquid crystal cell thereof.

FIG. 17C shows the structure of a liquid crystal display device 2C in accordance with a third embodiment that is manufactured using a first transparent substrate 16 or a component having a light control member 120 formed thereon according to the manufacturing method shown in FIG. 16A to FIG. 16E, and that includes a reflective layer 27 in a liquid crystal cell thereof. A second transparent substrate 19 is superposed on the side of the first transparent substrate 16 where an electrode (not shown) is provided, with a liquid crystal layer 26 and the reflective layer 27 between them, whereby the liquid crystal cell is produced. The liquid crystal layer 26 is sealed with a sealing member 24 and has a thickness of about 5 μm.

A difference of the liquid crystal display device 2C from the liquid crystal display device 2A shown in FIG. 17A lies in the disposition of the light control member 120 on the first transparent substrate 16. In the liquid crystal display device 2A in accordance with the first embodiment shown in FIG. 17A, the light control member 120 is formed inside a double-faced adhesive 21. On the other hand, in the liquid crystal display device 2C in accordance with the third embodiment shown in FIG. 17C, the light control member 120 is extended to a portion of the first transparent substrate to which a spacer 21 is bonded.

Figure 17D:
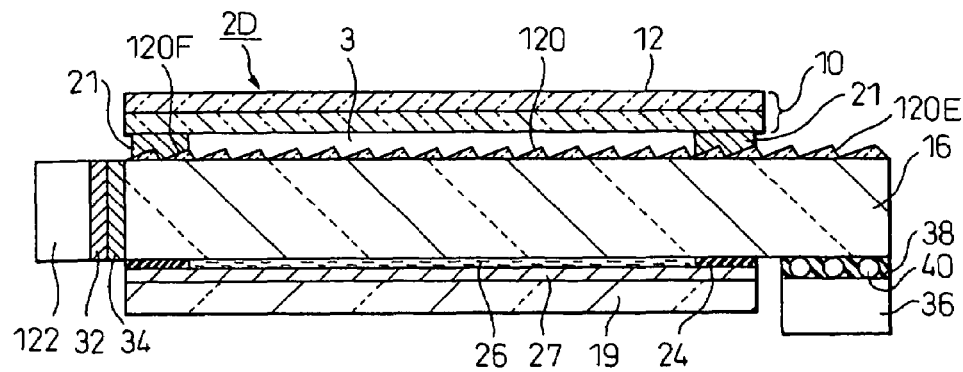
FIG. 17D is a sectional view showing a fourth embodiment of a liquid crystal display device which is manufactured using the component that has a light control member and is produced according to the manufacturing method shown in FIG. 16A to FIG. 16E, and which includes a reflective layer in a liquid crystal cell thereof.

FIG. 17D shows the structure of a liquid crystal display device 2D in accordance with a fourth embodiment that is manufactured using a first transparent substrate 16 or a component having a light control member 120 formed thereon according to the manufacturing method shown in FIG. 16A to FIG. 16E, and that includes a reflective layer 27 in a liquid crystal cell. A second transparent substrate 19 is superposed on the side of the first transparent substrate 16 where an electrode (not shown) is provided, with a liquid crystal layer 26 and the reflective layer 27 between them, whereby the liquid crystal cell is produced. The liquid crystal layer 26 is sealed with a sealing member 24 and has a thickness of about 5 μm.

A difference of the liquid crystal display device 2D shown in FIG. 17D from the liquid crystal display device 2C shown in FIG. 17C lies in a position at which the light control member 120 is formed. In the liquid crystal display device 2D shown in FIG. 17D, the light control member 120 is extended to the portion of the first transparent substrate 16 having the integrated circuit 36.

As mentioned above, the first transparent substrate 16 is manufactured with the light control member 120 formed on the side on which the electrode 6, that is a component of a display device, is not formed, opposite to the side on which the electrode 6 is formed, according to the manufacturing method shown in FIG. 16A to FIG. 16E. The first transparent substrate 16 can be used to produce a reflective liquid crystal cell having the reflective layer 26 interposed between the first transparent substrate 16 and the second transparent substrate 19 as shown in FIG. 17A to FIG. 17D. Moreover, the first transparent substrate 16 can be used to produce a liquid crystal cell having the reflective layer 27 formed on the external side of the second transparent substrate 19 as shown in FIG. 4A to FIG. 6B.

Moreover, the light control member 120 produced according to the manufacturing method shown in FIG. 7A to FIG. 7E or FIG. 16A to FIG. 16E can be adapted to a conventional scattering type liquid crystal display device like the one shown in FIG. 1B.

Furthermore, a twisted nematic (TN) liquid crystal, a super-twisted nematic (STN) liquid crystal, or a liquid crystal to be driven according to an active matrix addressing method using thin film transistors (TFTS) or thin film diodes (TFDs) may be adopted as the liquid crystal employed in the foregoing embodiments. Liquid crystal display devices for monochromatic display have been described so far. The present invention can be effectively applied to a reflective color liquid crystal display device employing a color filter.

Assuming that a color liquid crystal display device employing a color filter is manufactured using a first transparent substrate 16 having a light control member 120 formed thereon according to the manufacturing method shown in FIG. 16A to FIG. 16E, an electrode, an alignment layer, a liquid crystal, an alignment layer, an electrode, a color filter, a light shade film for shading light from the border of the color filter, and a second transparent substrate 19 are superposed in that order on the side of the first transparent substrate 16 opposite to the side thereof having the light control member 120 formed thereon. A light source is then mounted on one lateral side of the assembled liquid crystal cell.

The invention claimed is:

1. A display device comprising:
   a first transparent substrate having an internal side and an external side and an electrode;
   a second transparent substrate having an internal side and an external side and an electrode;
   a display cell having an electro-optic converting member, the optical characteristic of which is varied with an electric action, sealed between said internal sides of said first and second transparent substrates;
   a light control member made of an ultraviolet-setting adhering resin that is formed in place directly on and is in direct contact with and adhered to the external side of said first transparent substrate opposite to the internal side thereof in contact with said electro-optic converting member; and
   at least a light source mounted on an end of said first transparent substrate, wherein:
   said light control member has an irregular shape due to a plurality of grooves formed in parallel with one edge of said first transparent substrate on which said light source is mounted and the maximum height of a portion of said light control member located near said light source is smaller than the height of an other portion thereof located farther away from said light source.

2. A display device according to claim 1, wherein: said electro-optic converting member is sealed between the sides of said first and second transparent substrates on which transparent electrodes are placed, and is capable of transmitting ultraviolet light; and said light control member made of the ultraviolet-setting adhering resin is formed directly on the external side of said first transparent substrate by irradiating ultraviolet light to the external side of said second transparent substrate opposite to the internal side thereof in contract with said electro-optic converting member.

3. A display device according to claim 1, wherein said grooves are V-shaped grooves.

4. A display device according to claim 1, wherein a first polarizing member supported by a spacer is placed on an external side of said light control member opposite to a side thereof in direct contact with the external side of said first transparent substrate, and a surface of said spacer supporting said first polarizing member is located higher than said light control member.

5. A display device according to claim 4, wherein said spacer is made of the same material as said light control member, and is formed around an image display area of said display device.

6. A display device according to claim 4, wherein said spacer is an adhering member mounted on an uneven portion of said light control member.

7. A display device according to claim 4, wherein said spacer is formed along at least one edge of a frame area around an image display area of said display device.

8. A display device according to claim 7, wherein said one edge is one of the edges of said area around said image display area that is located farthest away from said light source.

9. A display device according to claim 1, wherein said light control member formed on the external side of said first transparent substrate lies over an entire surface of said first transparent substrate.

10. A display device according to claim 1, wherein: said first transparent substrate has a portion thereof jutting out relative to said second transparent substrate; and said light control member formed on the external side of said first transparent substrate lies over an entire surface of said first transparent substrate except for the jutting out portion.

11. A display device according to claim 1, wherein: said display cell has a liquid crystal sealed between the internal sides of said first and second transparent substrates; and a sealing member is disposed to prevent said liquid crystal leaking out from between said first and second transparent substrates.

* * * * *